United States Patent [19]

Bobeck et al.

[11] 3,879,585

[45] Apr. 22, 1975

[54] SINGLE WALL DOMAIN MEMORY ARRANGEMENT

[75] Inventors: Andrew Henry Bobeck, Chatham; Robert Frederick Fischer, Livingston; Joseph Edward Geusic, Berkeley Heights; Terence John Nelson, New Providence, all of N.J.

[73] Assignee: Bell Telephone Laboratories, Incorporated, Murray Hill, N.J.

[22] Filed: Feb. 20, 1974

[21] Appl. No.: 443,960

[52] U.S. Cl. ........................ 179/90 BB; 340/174 TF

[51] Int. Cl. ............................................ H04m 1/46

[58] Field of Search ...................... 179/90 BB, 90 B; 340/174 TF, 90 BD, 90 R, 174 PA

[56] References Cited

UNITED STATES PATENTS 3,618,054 11/1971 Bonyhard et al. ............ 340/174 TF 3,742,471 6/1973 Mikami ........................ 340/174 TF

*Primary Examiner*—Kathleen H. Claffy

*Assistant Examiner*—Gerald L. Brigance

*Attorney, Agent, or Firm*—H. M. Shapiro

[57] ABSTRACT

A low power magnetic bubble memory for use in, for example, telephone repertory dialer operation is achieved with existing bubble functional elements. An electrical conductor pattern is adapted to input, simultaneously, bubble patterns representative of decimal digit information as well as the control information for properly queuing and storing that information. An adaptation of the familiar major-minor bubble organization is employed. The dialer is designed to operate on sufficiently low power to be powered entirely from a telephone central office.

20 Claims, 16 Drawing Figures

SINGLE WALL DOMAIN MEMORY ARRANGEMENT

FIELD OF THE INVENTION

This invention relates to information storage arrangements and more particularly to such arrangements in which information is stored in the form of patterns of single wall, magnetic domains such as magnetic bubbles.

BACKGROUND OF THE INVENTION

Single wall, magnetic domains (bubbles) are now well known in the art. The movement of such magnetic domains in a layer of suitable material along channels defined by a pattern of elements coupled to the layer is disclosed in U.S. Pat. No. 3,534,347 of A. H. Bobeck issued Oct. 13, 1970. The domains are moved along the channels in response to a magnetic field which reorients in the plane of the layer. The operation is commonly termed a "field-access" mode of operation because domain movement is responsive to a uniform field drive rather than to conductor-supplied localized fields.

A variety of circuit arrangements for field-access bubble devices are well known in the art also. The organization of a field-access arrangement into a number of storage loops, and a single accessing loop, for example, is disclosed in U.S. Pat. No. 3,618,054, of P. I. Bonyhard, U. F. Gianola, and A. J. Perneski, issued Nov. 2, 1971. That organization employs storage loops for recirculating domain patterns as well as a transfer position at each loop for the selective movement of domains from the storage loops to the accessing loop. The accessing loop includes a detector and a write-in position. Organizations of this type are commonly referred to as "major-minor" organizations.

Usually in a major-minor arrangement, a bit from each minor loop (storage loop) is moved to the major loop (accessing loop) to constitute a word of information there. The arrangement is operative in this manner because typically a single control conductor couples all the bubble transfer positions between the major loop and the minor loops and access to an individual minor loop is not easily available. On the other hand, circuit arrangements do exist for selectively accessing the minor loops of a major-minor, field-access organization. U.S. Pat. No. 3,613,058 of P. I. Bonyhard, D. E. Kish and J. L. Smith, for example, discloses one such arrangement. That arrangement employs a plurality of electrical conductors coupled to the minor loops for transferring domains to and from a selected minor loop.

The use of magnetic bubble devices in telephone repertory dialers is shown in U.S. Pat. No. 3,508,225 of J. L. Smith issued Apr. 21, 1970. That patent discloses a conductor-driven (compare: field-access) arrangement where telephone number representations are stored in storage channels for selective movement to an accessing channel including a read-write port. In each instance, domain patterns are moved from a selected storage channel (permanent store) to the accessing channel during operation. In the conductor-driven arrangement, the entire domain pattern comes from a single storage channel because a single control conductor can be pulsed easily to select a single channel.

The general desirability of reducing the power necessary to run major-minor bubble memories is well understood in the art as grounded in the effort to reduce costs, particularly of operation. When it is contemplated to employ domain circuits of this type for use in a telephone repertory dialer circuit, on the other hand, the desirability is emphasized by the fact that either the circuit operates on less than the power (approximately 16 mw) available on the telephone line or an alternative such as customer supplied power or battery power is required. Customer supplied power, however, frequently requires installation of an added customer convenience outlet at considerable cost. Similarly, battery power is costly and requires periodic replacement. The availability of power over the telephone line, of course, is preferred.

BRIEF DESCRIPTION OF THE INVENTION

The present invention is directed at the realization of a relatively low power magnetic bubble memory organization. Operation of the memory is enabled in response to the lifting of a telephone station handset and is organized such that it requires sufficiently little power to be operative with the available telephone line power to perform repertory dialer functions. The invention is based, in one of its aspects on the recognition that the power necessary to operate a bubble memory is significantly reduced if the time during which the circuit is active in response to a command is short. Requisite power is further reduced by a bubble circuit which performs "logic" functions to a considerable extent by internal organization of the bubble arrangement rather than by external logic control circuits.

In one embodiment of this invention, the transfer of information from channel to channel within the memory is accomplished by replication. During a read operation, for example, information is extracted from a selected minor loop (repertory) in the memory by (bubble) replication into the major channel or path of the memory. The major path is not called a "loop" in this embodiment hereinbelow because replicated information is not recirculated in that path for eventual restoration to the originating minor loop. Rather, the replicated information is advanced at a fast rate to a detector stage for outdialing and for ultimate annihilation.

The major path, in this same embodiment, comprises three distinct portions in which information-movement control information as well as digit information is stored. Specifically, the path includes a multistage input portion, a replicate-annihilate portion associated with the minor loops, and an output portion including a multistage expansion detector arrangement terminating in a detector stage. A plurality of electrical input or "digit-select" conductors is associated with the stages of the input portion for generating domains in coded numbers of stages indicative of the conductor pulsed. The terminations of the conductors are arranged electrically-in-series at a reference potential so that a pulse in a selected conductor generates a corresponding coded number of bubbles in the associated stages. A pulse on any one of these conductors is also operative to initiate domain advancement everywhere in the memory.

The movement of bubble codes out of the input portion of the major path is terminated under the control of the movement-control information. The selected input conductor is operative, to this end, to generate a "queuing" bubble in an associated position (stage) in the expansion detector arrangement portion of the major path. That bubble is moved synchronously with the bubble code and is operative to terminate domain advancement when it arrives at the detector stage. Thus, a digit representation written into the input portion of the major path for advancement along that path, is accompanied by a queuing bubble simultaneously stored for advancement in a manner to terminate bubble advancement. Bubble movement terminates after bubbles are moved a coded number of positions necessary to empty the input portion each time a pulse is applied to a digit-select conductor. The digit-select pulses, of course, are applied in practice in response to the depression of a digit-select button as is discussed in greater detail hereinafter.

The movement-control information also determines the ultimate storage (repertory) location for a sequence of digit representations during a write operation. For this purpose the digit-select conductors also couple a spur track arrangement leading into the major path. When a digit-select conductor is pulsed, a "marker" bubble is generated in a position in the spur track arrangement indicative of the bubble input code and advanced to a replicator synchronously with the movement of the bubble input code. Each marker bubble further advances during a next subsequent digit store operation. The ultimate destination for such bubbles is a bubble "annihilator". Thus the marker bubble usually does nothing. But when all digit representations are stored and a minor loop is (subsequently) selected (by depression of a "repertory" push button) as a "permanent" store, the marker bubble for the last-entered digit representation is replicated into an auxiliary spur track intersecting the major path for advancement to the detector stage.

During a write operation, information in a selected minor loop is first annihilated to clear the loop to receive a newly written word. The minor loop is selected by the depression of a repertory button after the storage of the last digit representation in a telephone number. The repertory button depression also initiates both bubble advancement and bubble annihilation in the selected minor loop. Annihilation continues until the (marker) bubble replicated from the spur track reaches the detector stage. The presence of the bubble at that stage causes a signal which changes the annihilation operation to a replication operation. The major path is designed (viz: includes a number of stages) so that new information for storage arrives at the selected minor loop when (or after) the replicated marker bubble arrives at the detector stage. Therefore, old information is removed from a selected loop and new information is stored by replication into that loop under the control of information-movement control information simultaneously stored and moved with digit-representative information.

Operation, in either a read or a write operation occurs during the depression of a repertory or digit-select button hereinbelow.

The illustrative embodiment is described arbitrarily, in terms of a pattern of chevron-shaped magnetically soft elements for defining all the various paths, channels, and the expansion detector as well as the replicators, annihilators and generators. The chevron elements are described in U.S. Pat. No. 3,723,716 of A. H. Bobeck and H. E. D. Scovil issued Mar. 27, 1973. The expansion detector arrangement is disclosed in U.S. Pat. No. 3,713,120 of A. H. Bobeck, F. J. Ciak and W. Strauss, issued Jan. 23, 1973. The replicator is described in copending application Ser. No. 309,205 filed Nov. 24, 1972 for A. H. Bobeck and I. Danylchuk. The replicator is operative as an annihilator by a shift in phase in the control pulse as has been described at the International Magnetism Conference, Washington, D.C. Apr. 24–27, 1973 by A. H. Bobeck. A nucleate generator arrangement is operative as described in U.S. Pat. No. 3,789,375 of Y. S. Chen, J. E. Geusic, T. J. Nelson and H. M. Shapiro, issued Jan. 29, 1974.

DETAILED DISCLOSURE

BUBBLE CIRCUIT ORGANIZATION AND OPERATION

Figure 1:
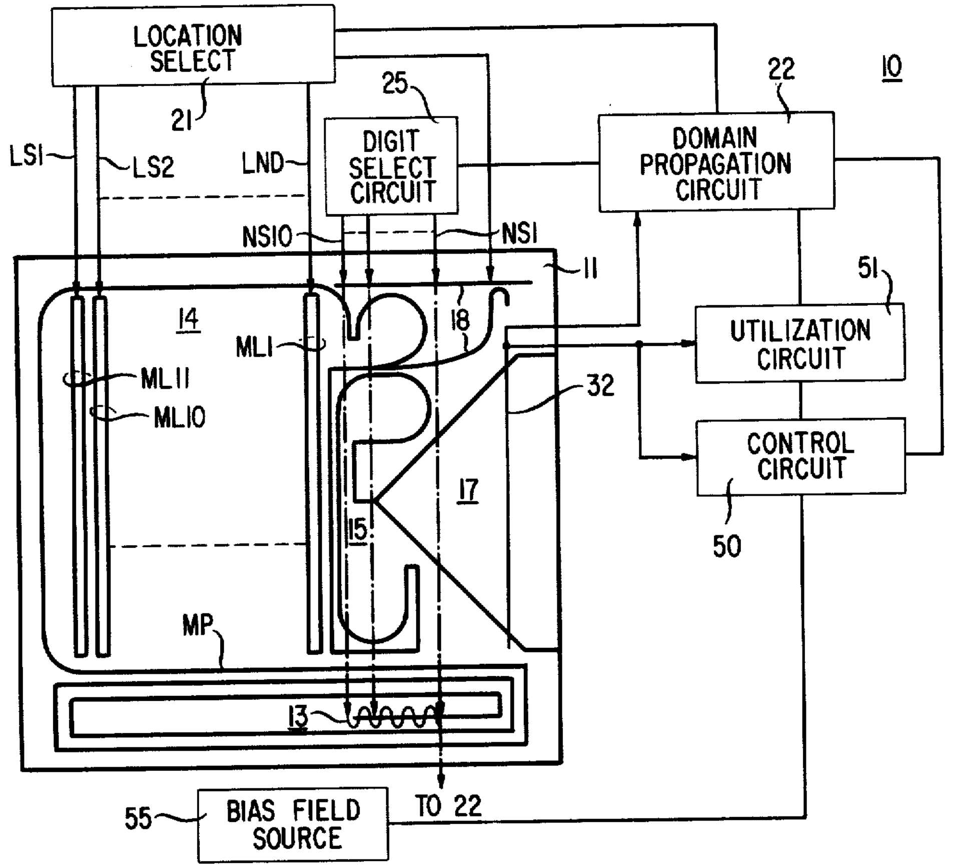
FIG. 1 is a schematic representation of a magnetic memory arrangement in accordance with this invention.

FIG. 1 shows an illustrative magnetic memory arrangement 10 in accordance with this invention. The arrangement comprises a layer 11 of material in which single wall domains can be moved. A pattern of magnetic elements, typically of magnetically soft permalloy, is formed on the surface of layer 11 and arranged in a plane spaced apart from the surface of layer 11 by a layer of, for example, silicon dioxide, as is well known in the art.

The pattern of elements form a number of channels for the movement of magnetic bubbles in response to a magnetic field reorienting in the plane of layer 11 operating in the well-known field-access mode. The channels can be seen in FIGS. 1, 2, and 3 to be organized in the major-minor mode mentioned above. Eleven minor loops $ML_1$, $ML_2$, . . . $ML_{11}$ are indicated in line diagram form in FIGS. 1 and 2. The pattern of elements defining those loops is shown in FIG. 3. The elements also form a single major path MP shown in line diagram form in FIGS. 1 and 2 and in detail in FIG. 3. The major path originates in an input portion 13, includes an area 14 where it partially defines access ports to the minor loops, and terminates in an output portion 15. The output portion includes an expander detector arrangement 17 and is associated with a spur track arrangement 18 shown in FIGS. 1, 2, and 3. The spur track arrangement will be seen hereinafter to be operative to introduce marker bubbles selectively into the major path to control the conversion from an annihilation to a replication operation at the access port to a selected minor loop during a write operation.

A plurality of conductors couple layer 11 in a manner to generate bubble codes representative of decimal digits and to control the movement of those codes. The conductors are organized into two major groups. One group is designated LND, LS1 . . . LS10 in FIGS. 1 and 2. The conductors of this group are connected to a location selection (repertory) matrix by which the conductors can be pulsed selectively. The selection arrangement is represented by block 21 in FIG. 1 and comprises typically a familiar repertory button arrangement in a repertory dialer.

Figure 2:
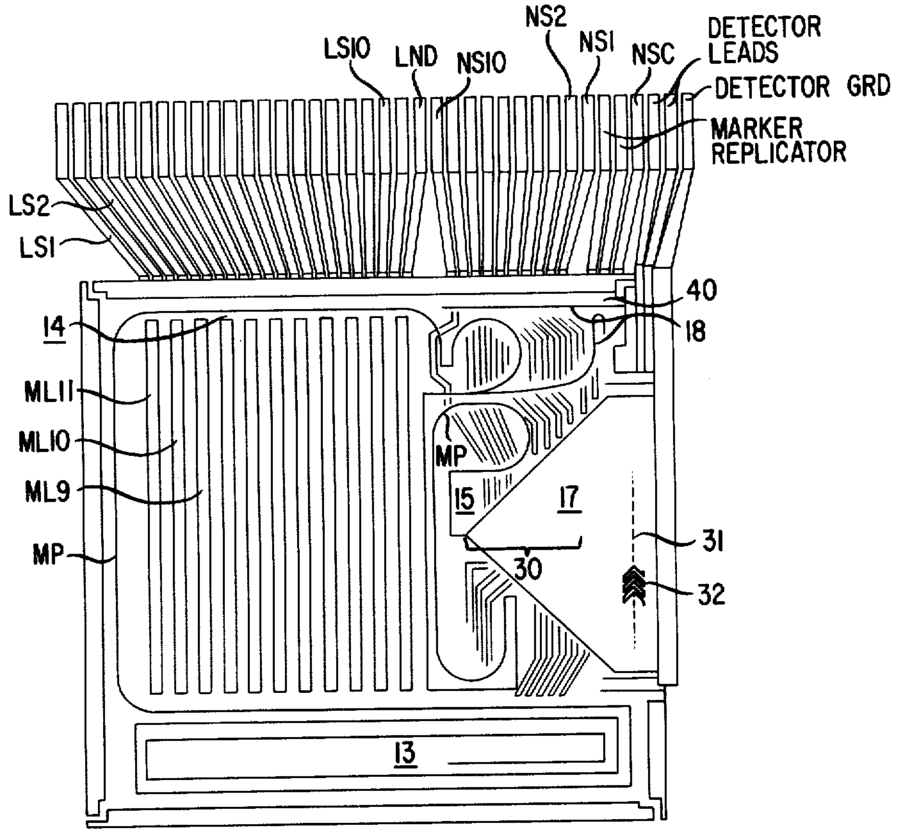
FIGS. 2 through 5 are top views of the patterns of magnetic elements and conductors defining the various functional elements of the arrangement of FIG. 1.
Figure 3:
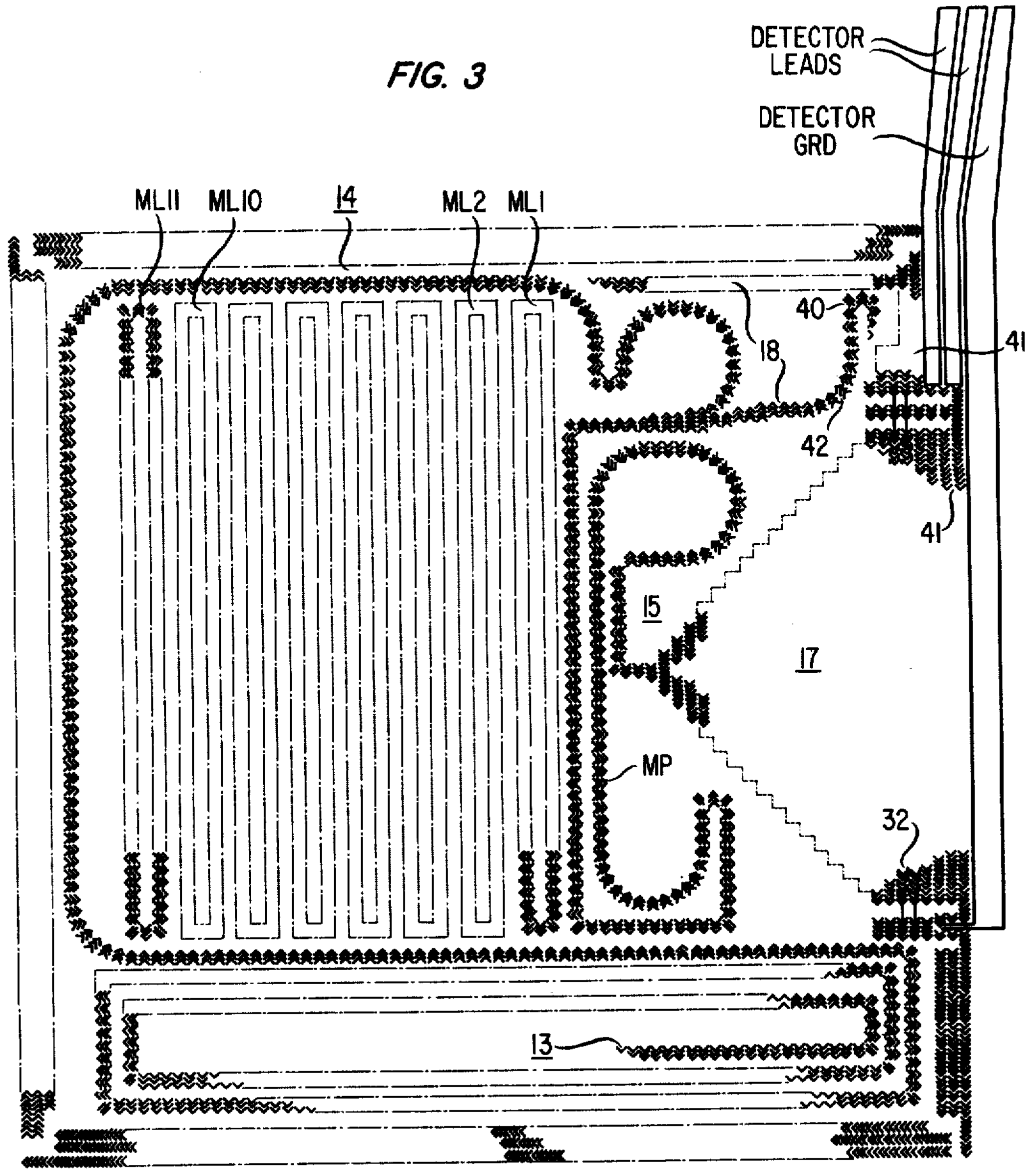
Figure 4:
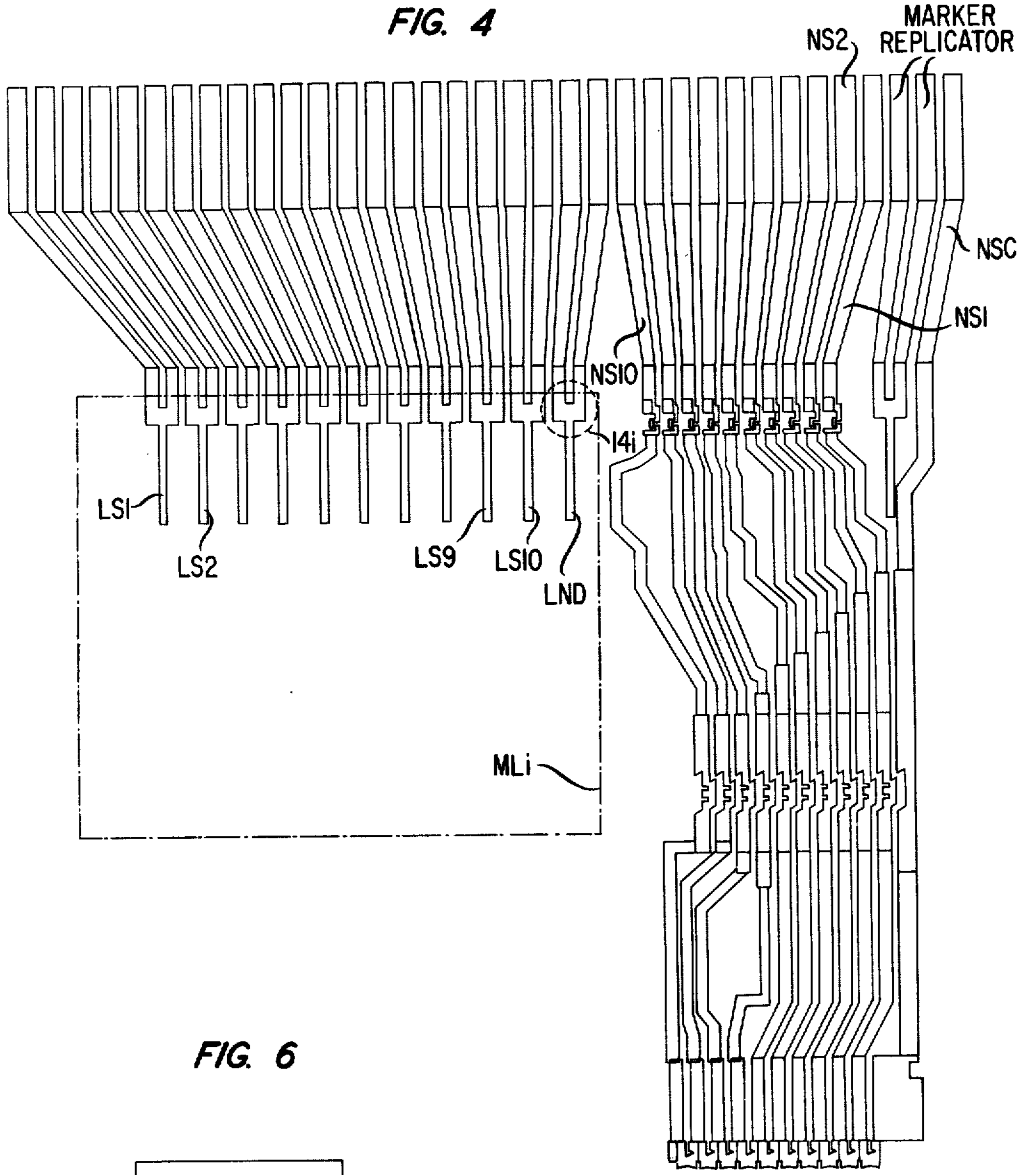

FIGS. 3 and 4 show the patterns of magnetic elements and conductors of FIG. 2, respectively. The minor loops are disposed in an area identified in FIG. 4 by an envelope indication designated ML*i*. The conductors LND and LS1 to LS10 are shown entering the envelope in FIG. 4 and are associated with the eleven minor loops ML1 and ML2 to ML11 in FIG. 3, respectively.

Figure 5:
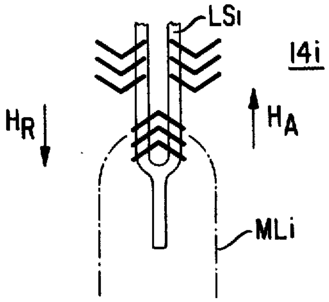

A representative area 14*i*, (FIG. 4) where the magnetic elements of a minor loop and the major path define an access port is shown expanded in FIG. 5. In this notation, the letter *i* is a dummy variable. Conductor LSi is coupled to layer 11 at a position defined by the magnetic elements for providing the control for bubble operation there. If a bubble lies between the legs of the bifurcated conductor LS*i* as shown in FIG. 5 when a negative polarity pulse is applied to the conductor, bubble annihilation occurs. The term negative polarity applies to a pulse which increases the (bias) field within the conductor. It may be appreciated that the presence (or absence) of a bubble in such a position (of loop ML*i*) occurs when a magnetic drive field in the plane of layer 11 is directed upward as viewed in the figure, a direction represented by arrow $H_A$ there. If a positive pulse is applied to conductor LSi, a domain is stretched rather than annihilated. If the resulting strip lies astride the legs of the conductor when a control pulse of negative polarity is applied, the strip will be cut and the bubble will be replicated. Replication occurs when the in-plane field is directed downward as indicated by the arrow $H_r$ in the figure. The operation of this element in the replication mode is fully disclosed in the above-mentioned copending application of A. H. Bobeck and I. Danylchuk. An in-plane field source is represented by block 22 of FIG. 1 designated domain propagation circuit generically.

The other group of conductors, designated NS1 to NS10 in FIG. 4, is responsive to the depression of digit (or number) select buttons. These conductors couple the spur track arrangement (18), the expansion detector arrangement (17), and the input portion (13) of the major path and are operative when pulsed to generate and to control the movement of bubble patterns in the memory. The conductors originate at a digit-select circuit represented in FIG. 1 by block 25 and terminate on a number select common lead designated NSC in FIGS. 2 and 4. Such a circuit may comprise, for example, a familiar telephone push-button array in a telephone station set.

The LND button, in practice, is physically located in the digit select array because of convenience. But it functions essentially as a repertory button and accordingly, the LND conductor is shown in FIG. 1 originating from block 21 rather than block 25.

A selected digit-select conductor, when pulsed, is operative to perform a variety of functions simultaneously. The prime function is to store a digit representation in the input portion of the major path (see 13 in FIGS. 1 and 3). The illustrative code represents the selected digit by an equivalent number of bubbles in consecutive storage locations. To this end, each digitselect conductor is coupled to layer 11 at a corresponding storage location of portion 13 and connected via the adjacent next lower order conductor to common lead NSC of FIGS. 2 and 4, to a reference potential. Moreover, the geometry of the conductor at each location is adapted to nucleate a bubble there when pulsed. Thus, the provision of a pulse in a selected conductor causes a bubble to be nucleated in each of the locations through which the conductor is connected to the reference potential. The result is the storage of the number of bubbles corresponding to the selected digit-select conductor.

Another function of the digit-select conductor is to control bubble advancement once the bubble codes are generated. To this end, the digit-select conductors terminate in a common connection to a control input to domain propagation circuit 22 of FIG. 1. A pulse on any digit-select conductor is operative to initiate circuit 22 to cause bubble advancement everywhere in layer 11.

The digit-select conductor also serves to control the termination of bubble advancement. The digit-select conductors couple layer 11 at positions also coupled by consecutive stages (actually alternate stages as will be made clear hereinafter) of the expansion portion 30 (see FIG. 2) of the expansion detector arrangement 17. When a selected conductor is pulsed, a queuing bubble is generated at the corresponding stage (of 30). That stage is a coded distance from the detector stage 31 at which bubble detection occurs. When a digit representation is entered in the input portion 13 of the major path, that representation and the (correspondingly coded) queuing bubble in portion 30 are advanced synchronously. The bubble in portion 30 is detected by a magnetoresistance detector 32 in stage 31 (see FIG. 2) for applying a signal to the domain propagation circuit for terminating bubble propagation. Thus, each depression of a digit-select button applies a signal to a selected one of conductors NS1 . . . NS10 for entering a digit representation and for advancing that representation out of portion 13 of FIG. 2 into a queue of bubble codes representing the sequence of digits dialed. The bubble in portion 17 may be understood to function as a queuing bubble, accordingly. Each button depression thus readies the circuit for a next subsequent digit.

Another operation, initiated by a pulse on a selected digit-select conductor, occurs in spur track arrangement 18 of FIGS. 1, 2, and 3. As was the case with the queuing bubble generated in the expansion portion 30, a marker bubble is similarly generated in a coded position of spur track arrangement 18. The marker bubble is moved to position 40 of FIG. 3 when the bubbles are advanced between digit store operations. Each next subsequent digit is accompanied by another marker bubble and the preceding marker bubble at 40 is advanced to the right as viewed in FIG. 3 into the guard rail 41. The guard rail is operative to remove bubbles from the active circuit and thus for all practical purposes annihilates such bubbles except in the important instance where no next subsequent digit occurs. The coded bubble associated with the last digit dialed remains at position 40. It will become clear that this bubble is operative as an end of dialing marker and serves to control the change from an annihilation to a replication operation at the access ports to the minor loops (see FIG. 5).

The guard rail structure is disclosed in U.S. Pat. 3,729,726 of A. H. Bobeck issued Apr. 24, 1973.

Figure 6:
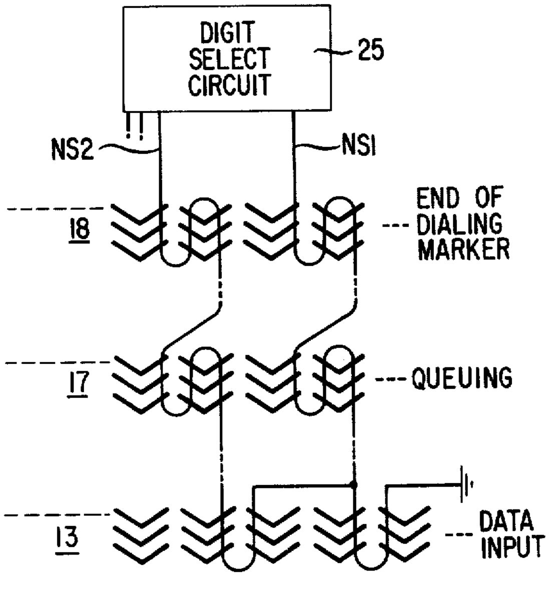
FIGS. 6, 7, and 8 are schematic illustrations of portions of the control and input geometries for the repertory dialer operation of the arrangement of FIG. 1.

FIG. 6 shows the relationship between the digit-select conductors and the pattern of magnetic elements where the generation of bubbles occurs during data input. It can be seen readily that a pulse in a selected conductor generates a marker bubble in a corresponding position of spur track arrangement 18, generates a queuing bubble in a corresponding position of the expansion detector arrangement 17 of the detector arrangement, and generates a coded number of bubbles in input portion 13.

Figure 7:
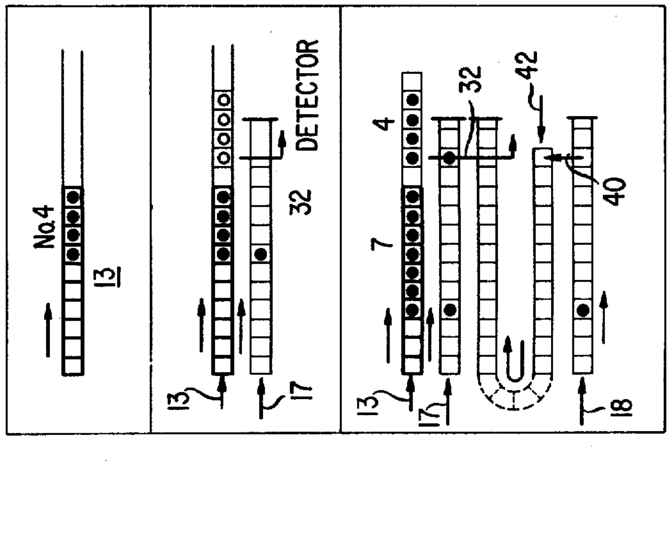

FIG. 7 is a schematic representation of various segments of the major path and is intended to show only the relationship of information moved in the various segments during operation and not the physical layout of the segments. The top section of the figure represents a succession of stages in the input portion 13 of the path. The black dots represent domains in those stages; each block represents a pair of stages. The representation for the digit 4 is shown.

The relationship between the queuing bubble in the expansion detector arrangement 17 of the major path and the digit representation is shown in the second section of the figure. All bubbles are moved (to the right as shown) simultaneously. The digit 4 representation moves to the position represented by the four circles and the bubble in arrangement 17 moves to the detector for signaling the termination of bubble movement.

When an entire telephone number is dialed, for example, a number ending in a digit seven (viz: 74 . . .), the marker bubble for the last digit (7) becomes important. The third section of FIG. 7 shows the relationship between the major path where it approaches the spur track arrangement at a point where the marker bubble for the final digit dialed is replicated (at position 40). The queuing bubble and the marker bubbles can be seen to be spaced from detector 32 and the replicator position 40, respectively, so that the termination of bubble movement after the dialing of a digit always leaves a bubble at 40.

The marker bubble at position 40 at the termination of an input operation is operative to control the movement of the telephone number representation into a selected minor loop. When the number input operation terminates, bubble movement stops until an additional command is received as mentioned hereinbefore. That command is received when, after a terminal digit of a telephone number is generated in the input portion of section 13 of the major path, a subscriber depresses a location-select (repertory) button which applies a pulse to one of the (repertory) conductors LND, LS1 to LS10.

Conductors LND and LS1 to LS10 are connected in parallel and then in series with a marker replicator conductor (so designated in FIGS. 2 and 4) so that a pulse occurs on the marker replicator conductor whenever a pulse is applied to conductor LND or to any one of conductors LS1 to LS10. A pulse on the marker replicate conductor is operative to replicate a domain in position 40. The replicated domain advances along spur track 42 (FIG. 3) into the major path (MP) for advancement to the detector 32 where it signals the conversion from an annihilate to a replicate operation at the access port to the selected minor loop.

A repertory dialer is operated normally in either a write or a read mode. At the outset of a write operation, a sequence of (decimal) digit-select buttons, indicative of the called number, is depressed. At the end of this sequence, bubble codes representative of the called number reside in the major path and operation ceases. The depression of a repertory location button at this juncture in the operation determines the (repertory) location in which the number is to be stored as well as initiates an outdialing procedure.

The storage of information in a selected (repertory) location is achieved by a sequence of (replicate) pulses applied to the associated one of conductors LS*i* of FIG. 5 during the depression of the selected repertory button. Storage thus occurs by replication into the location as the information stream passes the associated access port (FIG. 5) in the major path on its way to the expansion detection arrangement.

During a write operation, the replication operation is preceded by an annihilation operation initiated also in response to the depression of a repertory push button. Annihilation occurs by moving domains in a selected minor loop into the (associated) area of FIG. 5 and by pulsing the control conductor during an annihilation phase rather than during a replication phase of the in-plane field cycle. The annihilation operation terminates before the first bit of a newly stored number moving along the major path (entering from the left) reaches the area of FIG. 5. At this juncture in the operation, the replication operation is initiated. Illustratively, the change from annihilation to replication occurs by a change in the phase of the control pulse with respect to the in-plane field cycle, as mentioned above and as will be described more fully hereinafter.

The read operation occurs when a repertory button is depressed without a preceding depression of digit-select buttons. In this instance, domain propagation commences in a manner described hereinbefore and a replication operation is initiated immediately at the selected minor loop access port. Information stored in (alternate) locations of the selected loop is replicated into the major path for movement to the detector for outdialing. The minor loop has an odd number of stages so that the stored number occupies alternate positions once around the minor loop and then occupies the interleaved positions the second time around the loop. Each minor loop is sufficiently long to allow at least two adjacent zeros between the beginning and end of a maximum length telephone number which defines a start-number code. As will be explained hereinafter, replication ceases when the start-number code is detected at detector 32.

BUBBLE CIRCUIT TIMING AND CONTROL

It is helpful for an understanding of the operation of the illustrative embodiment to recognize that the lengths of the various bubble paths are important for controlling the movement of the number representation herein. Remember that a decimal digit representation is stored in the input portion of the major path and advanced (into a queue) to make room for the next digit representation. The queuing domain in the expansion portion of the detector arrangement effects the termination of that advance in each instance. The marker domain in spur track 18, when replicated at 40, controls the disposition of the sequence of digit representations (viz: telephone number) after the last digit representation is stored in portion 13 and in response to a (repertory) selection of a minor loop for storage. Thus, the movement of the number to a selected minor loop must be accomplished in the time (viz: in the same or a greater number of stages than) it takes the replicated marker domain to move to the detector 32. Since all the digits are stored (in a queue) in the major path prior to the movement of the entire number to a minor loop, the major path must have a sufficient number of bit locations (stages) to store that number.

In addition, the depression of the repertory button, causing replication at 40, initiates annihilation of the stored number in the selected minor loop. This annihilation occurs as domains are moving in layer 11 and must result in the selected minor loop being cleared before newly stored information arrives there. Thus, the major path must also include a sufficient number of bit locations into which the newly stored telephone number representation can move during this annihilation period.

Upon arrival of newly stored information at the selected minor loop for storage, a replication operation is initiated. The number of bit locations between position 40 (of FIG. 3) and detector 32 is chosen so that a newly stored number in portion 13 advances to the selected minor loop through a number of stages at least as great as the number of stages it takes to move the replicated bubble at 40 to detector 32. Newly stored information conveniently arrives at the selected minor loop in the (in-plane field) cycle in which a bubble at 32 signals a change from an annihilation to a replication operation at the access port to the selected minor loop. During the succeeding cycles of the in-plane field, the newly stored number is replicated into the selected minor loop, the original (representation) of the number moving further along the major path to detector 32 for outdialing. Full storage of the replicated copy of the number is accomplished prior to the arrival of the first bit of the original at detector 32 for outdialing. For repertory dialer operation, this choice of path lengths permits the subscriber to avoid outdialing merely by electing to go on-hook prior to completion of the outdialing operation. Since storage is accomplished at a high rate and since outdialing occurs at a lower rate acceptable to a telephone central office, a subscriber has little difficulty in controlling this operation.

For the illustrative repertory dialer operation, the storage capacity of the memory is eleven telephone numbers (ten plus the last number dialed) of eleven decimal digits each. The number of bits per digit includes a maximum of ten bits to describe the digit plus one bit interdigit space or a maximum total of eleven bits per digit. A telephone number, therefore, can consist of up to 120 bits.

Stored with each number is the number starting code which is minimum of two adjacent zero bits or two-bit spaces. Each number is stored in one of the eleven minor loops. The information is stored in every bit site in the minor loop, initially occupying every other site with the excess being interleaved to occupy the remaining sites. The loops consist of 123-bit sites providing both capacity for the maximum number plus the two-bit starting code as mentioned above.

The major path consists of 810-bit sites counting from the first generator input to the detector stage. Information is temporarily stored in the major path in alternate bit sites (see FIG. 6). To replicate the longest number in or out of a minor loop, therefore, requires operating time equivalent to propagating a bubble 2 to 123 bit sites or 246-bit sites.

In the major path, the first 20-bit sites are allocated to the input generators. The bit count from the 21st site to the first site preceding the closest minor loop input port is 242 (the extent of the maximum number) plus 246 (the count required to annihilate information in the selected minor loop) or a total of 488-bit sites.

When a repertory or last-number-dialed (LND) selection is made after a write operation, a marker bubble is replicated into a spur track 42 (see FIG. 3) connected to the major path feeding the detector. When the marker bubble is detected, annihilation of information in the selected minor loop is terminated and replication commences. The count, therefore, from the marker replicator to the detector is 246. One extra bit site is added making it 247 in order to permit replication of the marker bubble on the opposite phase from normal replication (see FIG. 5) and still have the marker bubble detected. This prevents detection of an anomalous bubble replicated from the selected minor loop simultaneously with the marker bubble.

The number of stages (count) in major path from the last minor loop port to the detector must be sufficient to contain the maximum number (246). However, in order to prevent interference with the marker bubble from an anomalous bubble, the count must be longer than 247. For convenience in circuit layout the count is 262.

The count from the queuing generator input closest to the detector stage is 4 providing the one bit interdigit space. The count from the marker bubble generator closest to the replicator is 5. The extra count allows replication after a propagate cycle starts since this replication occurs on an even cycle and operation starts in each instance on an odd cycle as will be explained further hereinafter.

It should be clear at this juncture in the description that the numbers of stages in the various loops and paths govern the movement of bubbles and the ultimate disposition thereof in layer 11. Particularly, for small circuits (viz: small numbers of bit positions), such as repertory dialers, by design only alternate bit sites are occupied by information. The reason for this is that a magnetoresistance element can be formed in each of two consecutive stages of the detector expansion arrangement to form two legs of a bridge which operates to the in-plane field.

As is typical of practical bubble memories, the bubbles are maintained at an operating diameter supplied by a familiar bias field source represented by block 55 of FIG. 1.

Figure 8:
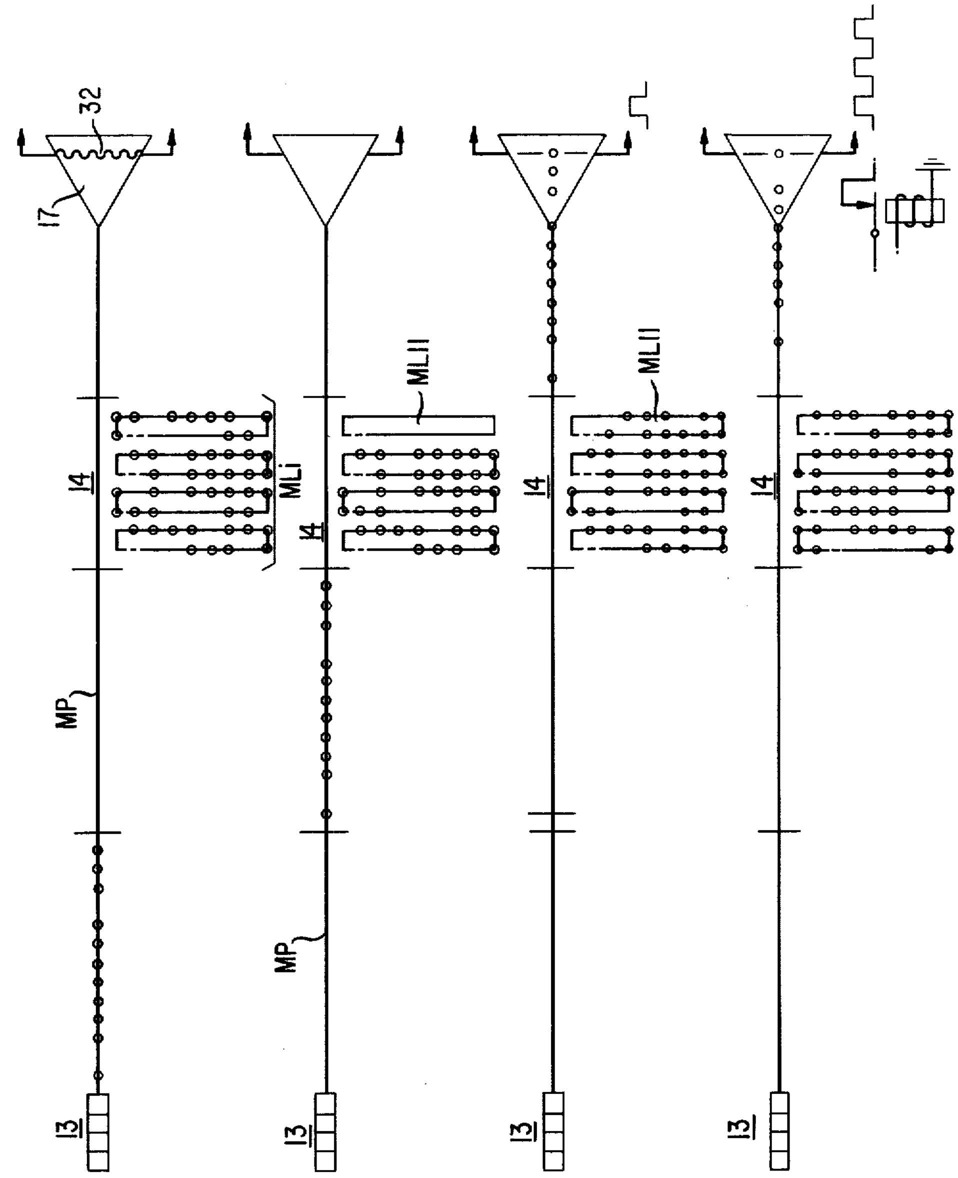

A typical write-store-outpulse sequence is shown in FIG. 8. The major path MP is shown as a straight line originating at the input portion 13 and terminating at the expansion detector arrangement 17 and passing the minor loops ML*i* at 14. The dots shown represent bubbles and each block, to the left as viewed, represents a pair of bit locations or stages in the major path. The number 371 . . . is shown in queue to the right of portion 13 as viewed on the top line in the figure. The second line of the figure represents a time after a location-select (repertory) button (for loop ML11) has been depressed. The number 371 . . . is shown advanced in the major path and the annihilation operation has cleared minor loop ML11 of information.

The third line of the figure shows the number 371 . . . stored both in minor loop ML11 as well as in path MP. The first bubble of the digit 3 representation at the detector stage is shown producing a pulse. The bottom line shows outdialing continuing in a dial pulse format in 100 kilohertz bursts - 100-msec. intervals by operating a relay shown to the right of the bottom line as viewed. For simplicity only three-digit representations are shown. The outdialing operation is described more fully hereinafter.

In the illustrative embodiment, all operations occur in the brief period during which a repertory or digit-select button is in the depressed condition. The circuit is designed to operate in such a burst mode in order to simplify logic control circuitry and to reduce power. As has been discussed, the typical path length in the bubble circuit is measured in terms of hundreds of bit locations. But operation occurs at a 100 kilohertz rate. Therefore, each operation is concluded in a very small fraction of a second, a period shorter than the shortest possible time for a control push button to be in a depressed condition. The relatively high currents employed for annihilation, replication, and generation operations described herein are necessary over only very short periods and can be supplied conveniently by a discharging capacitor without overtaxing the power supply available over the telephone line. Further, any necessity for apparatus to latch the button into a depressed condition and to unlatch the button thereafter is obviated.

We have now discussed the bubble circuit arrangement and the operation thereof in detail and are in a position to discuss the system organization in which the repertory dialer functions of that circuit are achieved.

SYSTEM ORGANIZATION

Figure 9:
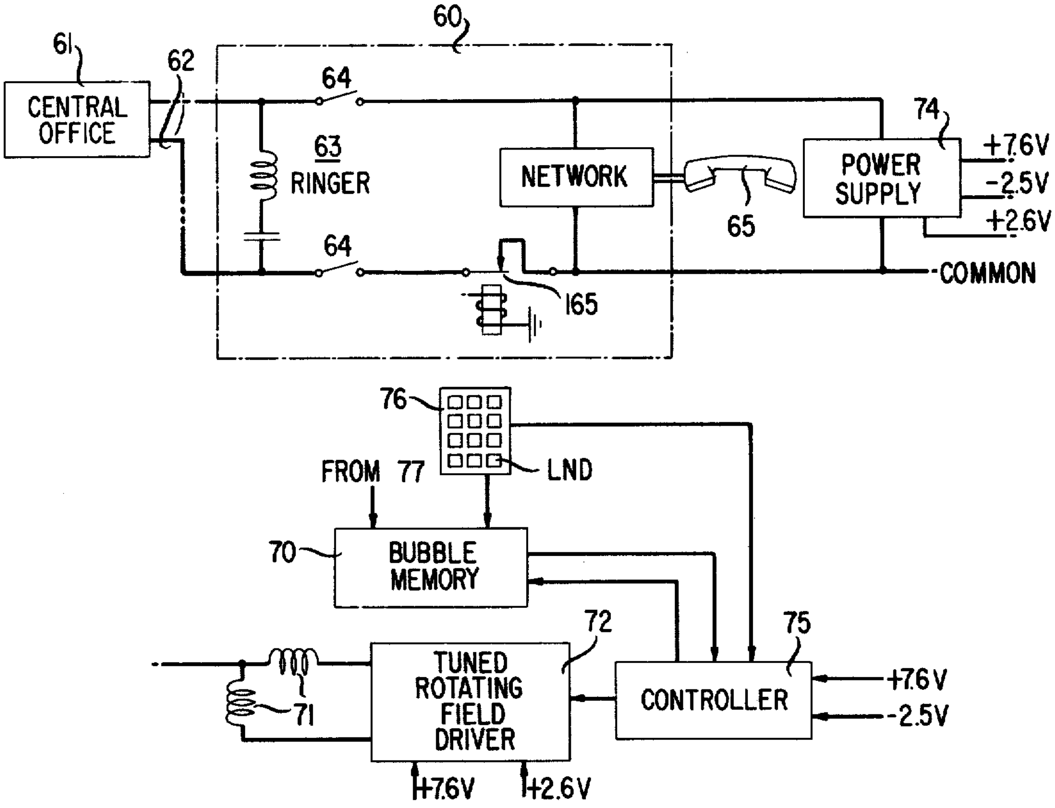
FIGS. 9 and 10 are schematic illustrations of a repertory dialer system organization and repertory pushbutton control therefor, respectively.

FIG. 9 shows the system organization for a bubble memory of the type shown in FIG. 1 in combination with a telephone station set and employed as a repertory dialer. It will be seen that the telephone handset, when elevated, is operative to enable the central office to supply power to the memory.

To this end, a telephone station set, represented by broken block 60, is connected to a central office 61 by telephone line (loop) 62. The set includes a ringer circuit 63, a pair of normally open switchhooks 64, and a network common to telephone station sets. The network is operative responsive to the elevation of handset 65, normally cradled by switchhooks 64.

A bubble memory of the type shown in FIG. 1 is represented by block 70 of FIG. 9. The driver coil arrangement for supplying the rotating field for that memory is represented at 71 shown connected to a field driver circuit 72. Circuit 72 and coils 71 correspond to the domain propagation circuit 22 of FIG. 1 for a field-access bubble circuit.

A power supply 74 is connected electrically in parallel with the ringer circuit and the network as shown in FIG. 9. The power supply illustratively supplies +7.6 volts, −2.5 volts, and +2.6 volts. A particularly attractive power supply for supplying a regulated current for the bubble memory herein despite the normal wide differences in line voltages is disclosed hereinafter. Power supply 74 supplies the noted voltages to field driver 72 and to a controller circuit 75. Controller circuit 75 corresponds to circuit 50 of FIG. 1.

Controller 75 is conveniently of CMOS integrated circuit construction to reduce power requirements and is operative to control the circuit of FIG. 2 in a manner described hereinbefore. The operation of the controller illustratively is responsive to the depression of buttons in a button array 76 which supplies the digit-select signals and the last-number-dialed (LND) signal. Array 76 is considered to be included in block 25 of FIG. 1 except for the LND button which although physically in array 76 is functionally a repertory button. The controller is also responsive to a button arrangement 77 shown in FIG. 10 for generating location-select (repertory) signals. Array 77 includes ten buttons PB1 . . . PB10 corresponding to parties the numbers for whom are stored in associated locations and, along with the last-number-dialed button of array 76 constitutes an eleven-number repertory herein.

SYSTEM OPERATION

Figure 10:
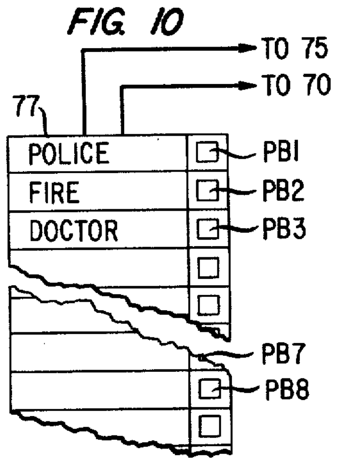

An understanding of the overall organization of the repertory dialer system of FIGS. 9 and 10 is facilitated by a consideration of an illustrative operation thereof. Consider specifically the write and read operation of an illustrative telephone number 78 . . .

The illustrative operation is initiated by lifting the handset 65 of telephone station set 60 as shown in FIG. 9. The set is now in the familiar off-hook condition and a dial tone is provided on telephone line 62 from the central office 61 when the off-hook signal is detected. The central office supplies typically at least 16 milliwatts on line 62 in response to the off-hook signal.

The illustrative push-button dial 76 is employed to call the assumed number 78 . . . In response to the dialing of each digit, the corresponding number of bubbles (N) is entered into the input portion (13 of FIG. 1) of memory 70 and advanced N+1 pairs of steps until the entire number is dialed.

In FIG. 10, the illustrative repertory button array comprises mechanical push buttons PB1 to PB11 corresponding to minor loops of the memory. The depression of push button PB7 activates field driver 72 for advancing domains and applies a pulse to conductor LS7 (of FIG. 1) during each (alternate) cycle of the in-plane field at a phase with respect thereto to annihilate bubbles in minor loop ML7. The phase of that pulse is changed by a signal from the detector (see 32, FIG. 1) upon the arrival of the marker bubble, from 40 of FIG. 2, at the detector stage as will be discussed more fully hereinafter.

The new telephone number is replicated into minor loop ML7 during alternative cycles of the in-plane field. Since that storage is accomplished by replication into the minor loop, the advance of the number representation in the major path also continues. When a first bubble arrives at the detector, dial pulses are supplied to the central office over line 62 of FIG. 6 as is explained hereinafter.

At the termination of the outdialing sequence or when the handset is replaced and an on-hook signal is received, the controller 75 terminates the operation of the entire repertory circuit. Thus, the handset acts to enable and to disable the powering of the in-plane field over the telephone line responsive to subscriber action.

The read operation is quite similar. The subscriber goes off hook and the central office supplies power to the line. A location select button, say, PB7, is depressed and control circuit 75 of FIG. 9 supplies a pulse to conductor LS7 at a phase during each of alternative cycles of the in-plane field to cause replication. Replication during the read operation is from the minor loop to the major path. But this operation is entirely analogous to the replication in the opposite direction (major path to minor loop) which occurs during a write operation. The advancing replicated representation outdials as before.

In order for the bubble memory organization of FIG. 1 to operate on the low power available over typical telephone lines, the logic, power supply, and drive circuits shown in FIG. 9 are designed for achieving the operation as described above with surprisingly low power requirements. These circuits for use in the system of FIG. 9 are now discussed along with the operation of those circuits for achieving the repertory dialer functions described hereinbefore.

LOGIC CIRCUITRY

Figure 12:
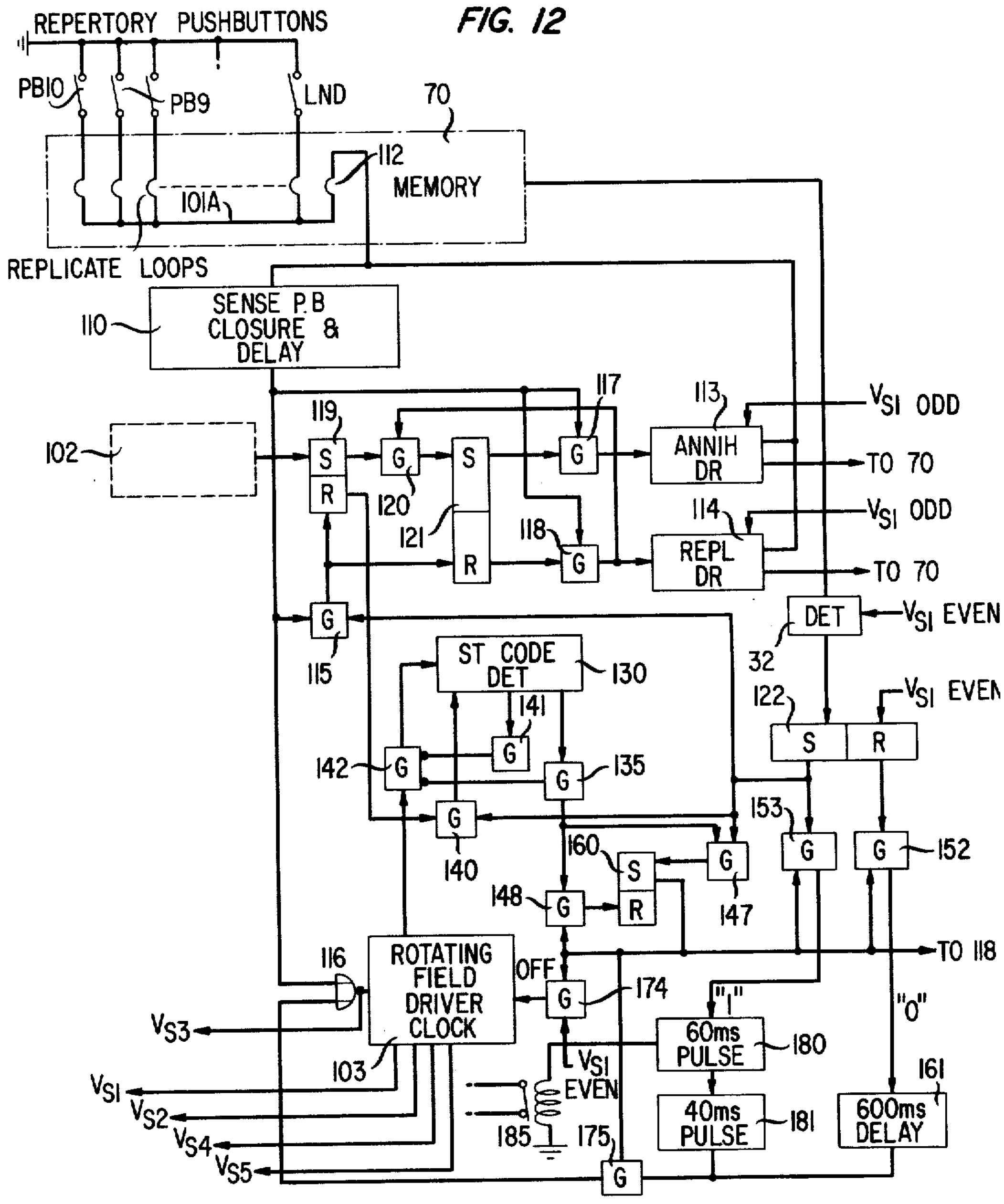
Figure 11:
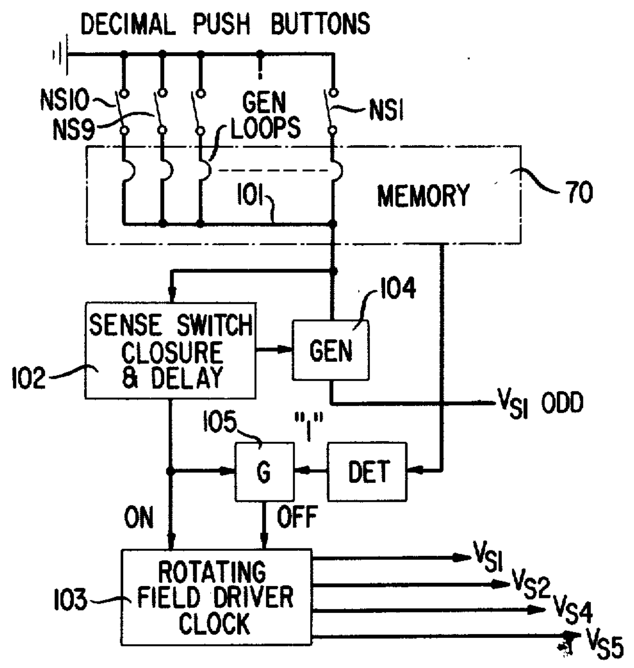

FIGS. 11 and 12 depict logic diagrams for the implementation of the functions described above in terms of the movement of bubble patterns and constitute portions of controller 75 of FIG. 9. For an understanding of some aspects of these diagrams, it is important to remember that adjacent bubbles are stored in alternative positions rather than in adjacent positions in the major path of the illustrative bubble circuit. The logic circuitry is organized to be consistent with this illustrative format for the information.

FIG. 11 deals with the write operation in which number generation in the major path of the bubble circuit occurs. The figure shows a parallel arrangement of push-button switch representations corresponding to conductors NS1 to NS10 of FIG. 2 for initiating a write (number storing) operation. The memory arrangement is represented in FIG. 11 as broken closed line 70. The push buttons are shown in electrical paths indicated by lines between a ground indication and a bus bar 101 which corresponds to lead NSC of FIG. 2. Each of these paths includes bubble generators represented by loops designated gen loops in the figure. The loop in each path represents the bubble generators in area 13 (the input portion) of the major path in FIG. 2, the detector portion 17, and the spur track arrangement 18, and appears physically as shown in FIGS. 4 and 6.

Bus bar 101 of FIG. 11 is connected to an input to circuit 102 representative of a switch closure sensor and delay circuit. Circuit 102 is operative as a timing circuit and includes a two-millisecond delay to avoid familiar switch bounce before providing an enabling output pulse. An output pulse from circuit 102 is applied to rotating field drive clock 103, to a pulse generator 104, and to a gate 105.

Clock 103 is a conventional clock for supplying pulses in quadrature at a 100 kc rate. The clock typically comprises two monopulsers which provide drive pulses at a 400 kilocycle rate as well as trigger pulses at the same frequency. The drive pulses are applied to an input of a two-stage counter which, in turn, provides pulses sequentially to four outputs. These outputs are applied to a decoder to which the trigger pulses are also applied for enabling proper timing outputs therefrom. The timing outputs, designated $V_{S1}$, $V_{S2}$, $V_{S4}$, and $V_{S5}$, are operative to activate and terminate the rotating field in a manner to be described hereinbelow.

In general and as described hereinbefore, the depression of a decimal digit push button closes an associated mechanical switch in FIG. 11 causing bus bar 101 to be grounded. In response, (timing) circuit 102 activates pulse generator 104. In turn, generator 104 applies a pulse to a selected number-select conductor of FIG. 4 thereby generating, via the arrangement of FIGS. 4 and 6, a bubble code, a queuing bubble, and a marker bubble at 13, 17, 18 of FIG. 2, respectively. Circuit 102 simultaneously applies a pulse to an input to each of clock 103 and gate 105. Clock 103 applies outputs $V_{S1}$, $V_{S2}$, $V_{S4}$, and $V_{S5}$ to rotating field driver 72 (in a manner more fully described hereinafter) which responds to move the bubble code, the queuing bubble, and the marker bubble. The arrival of the queuing bubble at stage 31 of the detector arrangement is detected by detector 32 which responds to apply a pulse to activate gate 105. Gate 105 deactivates clock 103 terminating the clock pulses and thus terminating bubble movement in the memory. The operation results in the queuing of a decimal digit representation in the major path readying the memory for receiving the next subsequent digit representation during a write operation.

The operation repeats for each digit stored. For each digit stored, a marker bubble is generated at 18 (of FIG. 2) and advanced to 40 of FIG. 3. For each decimal push-button depression, the marker bubble for the preceding digit is propagated past the replicate port 40 and into the guard rail 41 to be annihilated. When an entire number of many digits is sotred, no subsequent digit push button is depressed and the marker bubble remains at 40.

Next, a repertory or the LND push button is depressed for the movement of the stored number to a repertory location (minor loop). The depression of a repertory (or LND) push button occasions the replication of the marker bubble. FIG. 12 is a schematic of the logic circuitry for implementing the storage and outdialing operations responsive to the depression of a repertory push button.

FIG. 12 again depicts the memory of FIG. 2 as broken closed line 70. The term repertory push buttons designates switches PB1 . . . PB10 and LND collectively in the figure. The electrical paths associated with the switches are represented as lines connected between a bus bar 101A and ground. The electrical paths include replicate loops so designated in the figure. Bus bar 101A also includes a replicate loop, designated 112, representing a replicate position at 40 of FIG. 2. Bus bar 101A is connected to a sense push-button closure sensing and delay circuit 110, to an annihilate pulse generator 113, and to a replicate pulse generator 114. Pulse generators 113 and 114 are transistor circuits operative, when activated, to pulse a selected one of conductors LND and LS1 to LS10 of FIGS. 1 and 2 to which each pulse generator is connected.

Sense push-button closure and delay circuit 110 is employed for the repertory buttons as is similar circuit 102 of FIG. 11 employed for the digit buttons. This circuit also operates as a timer to avoid switchhook bounce and provides a delayed (enabling) output to a gate 115, to rotating field drive clock 103 (via OR circuit 116), and to an input of each of gate circuits 117 and 118.

The operation of this portion of the circuit arrangement of FIG. 12 is dependent on whether or not a decimal push-button depression occurs prior to the depression of a repertory push button for write or read operations, respectively. During a write operation, information previously stored in the selected repertory location is annihilated to make room for newly written information. Flip-flop 119, normally in a reset state, is set if a decimal push button is depressed prior to a repertory button, for effecting an annihilate operation. FIG. 12 shows circuit 102 (of FIG. 11), connected to the set input flip-flop 119 to indicate such prior decimal pushbutton depression.

The set output of flip-flop 119 is connected to an input of gate 120. The output of gate 120 is connected to the set input of flip-flop 121. The set and reset outputs of flip-flop 121 are connected to inputs of gates 117 and 118, respectively. The depression of a decimal push button was already seen to cause the generation of bubble codes in memory. Such a depression also sets flip-flop 119 and enables gate 120. The depression of the repertory push button thereafter, activates replicate pulse generator 114, via gate 118, while flip-flop 121 is in the reset condition, thus permitting the provision of a single replicate pulse (viz: for replicating the marker bubble). The output of gate 118 is also connected to an input of gate 120. Consequently, when gate 118 is activated, it activates gate 120 to set flip-flop 121 to initiate the annihilate operation. Conductors LND and LS1 to LS10 are connected between annihilate driver 113 and replicate driver 114 and ground by means of a common lead designated marker replicator in FIG. 2. The marker replicator lead couples position 40 of FIG. 2 for replicating the marker bubble when any such conductor is pulsed. Thus, the depression of a decimal push button enables a single replicate pulse followed by annihilate pulses, and the subsequent number store operation occurs in response to a subsequent depression of a repertory push button during a write operation.

We will assume for the moment that clock 103 is activated and that all bubbles in memory are being moved in response to the depression of a repertory pushbutton subsequent to the depression of a sequence of decimal pushbuttons during a write operation. Pulse generator 113, when activated, applies periodic annihilate pulses to the selected repertory conductor in response to timing pulses synchronized with alternate (odd) cycles of the rotating field at a phase thereof in which a bubble in the selected minor loop is in a position for annihilation. The timing is determined by pulses taken from clock 103 in a manner well understood in the art and described more fully hereinafter.

The marker bubble controls the change in operation from annihilation to replication at the access port to the selected minor loop. Replication of a marker bubble at 40 of FIG. 2 places a (new) bubble in a spur track 42 of FIG. 3 for movement to the detector (32). Detector 32 is shown in FIG. 12 connected to the set input of a normally reset flip-flop 122. The set output of flip-flop 122 is connected to gate 115. Gate 115 is connected to the reset inputs of flip-flops 119 and 121. The detection of the (marker) bubble at 32 results in the setting of flip-flop 122 and the activation of enabled gate 115. Gate 115 resets flip-flops 119 and 121. Gates 117 and 118, in turn, are deactivated and activated, respectively, thus initiating a replication operation and terminating the annihilation of information from the selected minor loop. The selected minor loop is now cleared of information and the rotating field has advanced new information to the access port of that loop.

The new information is replicated from the major path into the selected minor loop for storage in response to pulses applied to the corresponding repertory conductor by replicate pulse generator 114. These replication pulses continue until a bubble arrives at detector 32. The first bubble arriving at detector 32 resets an outdialing flip-flop, to be described, which disables gate 118 and thus terminates replication. Information is now stored in the selected minor loop and an outdialing operation has commenced. Since the outdialing operation is the same regardless of whether a write or a read operation is in progress, we will describe the logic for the read operation before discussing the outdialing implementation and operation.

When a read operation is initiated, a repertory pushbutton is depressed without the prior depression of a decimal pushbutton. Therefore, flip-flop 119 remains in a reset condition as does flip-flop 121. Consequently, replicate pulse generator 114 causes replication of the stored number at the access port to the selected minor loop. But the number of stages between the first bit of a stored number in the selected minor loop and the access port to that loop is unknown. Thus, the order of bits replicated into the major path during the read operation is not predetermined. Accordingly, the stored information is chosen to include a start code to properly sequence the information for a read operation.

Although stored information is interleaved in the minor loops (repertory locations), each loop includes more stages than the maximum number of bits which the system is designed to accept. The beginning of a selected (repertory) stored number, therefore, is proceeded by at least two consecutive zeros (no-bubble indications). These two zeros constitute the start-code indication.

Detector 130 of FIG. 12 represents a start-code detector which is, essentially, a two-stage counter first enabled and then reset in response to consecutive binary 1 indications (a bubble detected by 32). In general, on the occurrence of two zeros (absence of a bubble at 32) in a row, detector 130 enables a gate 135 and stops to await a subsequent 1 for providing an output. An output of the detector, subsequently applied to gate 135, indicates the arrival of the beginning of the word at detector 32 in a proper sequence for read-out (outdialing) in response to the depression of a selected repertory pushbutton. The start-code detector thus can be seen to initiate outdialing in response to the depression of a repertory location-select button during a read operation. It will be seen that the start-code detector similarly responds to a marker bubble during a write operation. The detailed operation of the start-code detector is now discussed.

The start-code detector has a number of functions which are determined by the state of that detector. As a two-stage counter, detector 130 has four states. These states are 11, 00, 10, 01, of which the 11 state is chosen as the reset condition. States 11 and 01 correspond to output voltage levels. These two states control the out-dialing operation.

To implement this control, detector 32 (via flip-flop 122) and the reset output of flip-flop 119 are connected to the inputs of gate 140 in FIG. 12. The output of gate 140 is connected to an input of detector 130. The 11 output of detector 130 is connected to the input of gate 141. The 01 output of detector 130 is connected to gate 135. The outputs of gates 135 and 141 are connected to inhibit inputs of gate 142. An output of clock 103 is also connected to an input of gate 142. The output of gate 142 is connected to start-code detector 130. The initial condition for detector 130 is assumed to be the 11 state. When the detector is in this condition, gate 141 inhibits gate 142 and gate 142 disables the detector 130.

When detector 32 detects a bubble, it applies a 1 to gate 140 via the set output of flip-flop 122. Gate 140, in turn, drives detector 130 to a 00 condition and enables detector 130 to start counting zeros in the data stream advanced to detector 32 by the rotating field driver. Specifically, when detector 130 is in the 00 condition, gate 141 is disabled and gate 142 is not inhibited. Circuit 130 is now awaiting zeros.

The circuit (130) advances to the 10 state when, next, it receives a 0. A 0 may be viewed as a timing pulse applied to gate 142 in the absence of a bubble at detector 32. If the next subsequent signal after the 0 is a 1, detector 32 activates gate 140 and circuit 130 returns to the 00 state. If, instead, that next subsequent signal is a zero, circuit 130 advances to the 01 state. In this state, gate 135 provides an inhibit signal to gate 142, preventing the counting of successive zeros.

The output of gate 135 also is connected to the inputs of gate 147 and 148. The outputs of gates 147 and 148, in turn, are connected to set and reset inputs of flip-flop 160 (the outdialing flip-flop), respectively. On receiving two zeros in sequence, detector 130 advances to the 01 state and gate 135 provides an output. That output enables gate 147. Gate 147 is activated by a next subsequent 1 from detector 32. In response gate 147 sets flip-flop 160 thus enabling an outdialing operation.

It should be clear at this junction in the description that either a read or a write operation results in the advance of a bubble code representative of a telephone number to the detector while a repertory push-button or the LND pushbutton is in a depressed condition. The arrival of a bubble at the detector terminates the rotating field and thus terminates bubble movement, and initiates an outdialing operation as is now described.

Flip-flop 160 serves as the outdialing flip-flop operating to control the pulses sent to a telephone central office as well as the timing of those pulses and the interdigit spacings. The set output of flip-flop 160, more specifically, is connected to inputs of gates 148, 152, and 153 for enabling those gates and is operative further to activate and deactivate the rotating field clock 103. The control for gates 152 and 153 comprises gates 147 and 148 as well as the outdialing flip-flop 160. When a start-code (double zero) signal is applied to gate 135, gate 135 enables both gates 147 and 148. Thereafter, when flip-flop 122 next is in a set condition (viz: 1 from detector 32), gate 147 is activated and flip-flop 160 applies a set output signal to gates 152, 153, and to gate 148. Flip-flop 160 remains set during the entire outdialing operation. Thus, during a read operation, the start-code detector is operative to organize stored information in a proper sequence so that an outdialing operation commences when a bubble arrives at the detector.

During a write operation, the marker bubble operates similarly to change the state of detector 130 from 11 to 00 in order to enable outdialing. When this bubble passes detector 32, the detector sets flip-flop 122 enabling gate 115. This operation, in turn, resets flip-flops 119 and 121. Flip-flop 119 enables gate 140 and the set output of flip-flop 122 activates start-code detector 130 via gate 140. The double-zero (start) code requirement is met in this instance by the empty spaces between the marker bubble and the information stream.

Of course, during the write operation, we know the first bubble encountered by detector 32 corresponds to the start of the outdialing information whereas during the read operation, the stored information may arrive at the detector in the wrong order (i.e., in the middle of the stream). In the latter case, the (start-code) circuit 130 operates to recirculate the information in the minor loop, replicating the data therein until the end of the data stream is encountered at the detector and the subsequent two-zero code allows outdialing in response to the next subsequent 1 as described. Ultimately, a start-code signal is applied to gate 135 as in the write operation and gate 135 enables gates 147 and 148. When flip-flop 122 is next in a set condition, gate 147 is activated and flip-flop 160 applies a set output signal to gates 152, 153, and to gate 148 as in a write operation.

The outdialing pulse sequence is responsive to the movement of bubbles past detector 32 of FIG. 2. Gate 153 is operative to separate 1 (a bubble) and 0 (an absence of a bubble) signals from the detector. The output of detector 32 is applied to a set input of (normally reset) flip-flop 122, the reset output of which is connected to an input of gate 152. If flip-flop 122 is in the reset condition (0 signal), gate 152 is activated and, in turn, activates a 600-millisecond delay circuit for providing interdigit spacings in the outdialed pulse sequence. The set output of flip-flop 122 is connected to gates 153 and 147. When a bubble is detected (1), flip-flop 122 is set, and gate 153 is activated. In response, an outdialing flip-flop is set for 60 milliseconds and the rotating field deactivated every odd cycle of the in-plane field is then activated after another 40 milliseconds establishing a pulse pattern comprising a 60-millisecond pulse with a 40-millisecond spacing which is repeated for each bubble detected at 32. Thus a pulse format of 60-millisecond pulses and 40-millisecond spacings is generated reflecting the number of stored bubbles representative of a decimal digit. A 600-millisecond spacing is provided between the digit representations.

A variety of additional logic gates are controlled by flip-flop 160 to establish this outdialing pulse sequence during either the read or the write operation consistent with the assumed alternate spacing of information in memory. A gate 174, for example, is connected to the set output of flip-flop 160. An input to gate 174 is connected to a flip-flop (not shown) which provides an enabling signal thereto at the end of every even cycle of the in-plane field. The output of gate 174 is connected to clock 103 operating to deactivate clock 103 at the end of alternate cycles. The set output of flip-flop 160 also is connected to the input of gates 148 and 175. When flip-flop 160 is in the set condition, gate 175 is enabled and allows outputs from circuit 161 and from circuits 180 and 181 to restore clock 103 after deactivation. When detector 130 receives two zeros in sequence, gate 148 is enabled by gate 135 while flip-flop 160 is in the set condition. As a result, flip-flop 160 is reset, gate 175 is disabled, and clock 103 is not thereafter restarted after deactivation. The bubble drive field thus operates for two cycles, then stops for 100 milliseconds or 600 milliseconds depending on whether a 1 or a 0 is being dialed out respectively.

The output pulse sequence is actually generated by relay 185. Circuit 180, when activated in response to the detection of a bubble, generates a 60-millisecond pulse, the leading edge of which sets relay 185, and the trailing edge of which resets relay 185 and activates circuit 181. Circuit 181 generates a 40-millisecond pulse, the trailing edge of which activates gate 175 and thus clock 103. Each bubble detected generates a 60-millisecond pulse and after 40 milliseconds activates the rotating field to search for a next bubble. If a next bubble is detected, a second 60-millisecond pulse occurs and the process repeats. If a zero is detected, gate 152 first activates clock 103 via circuit 161 and thereafter activates gate 175 after a 600-millisecond delay corresponding to an interdigit spacing.

It is helpful to remember that the rotating field stops each time a bubble is detected once the start-code signal occurs. Moreover, flip-flop 122 is constantly being reset by timing pulses from clock 103 in the absence of a 1 signal. Thus, either gate 152 or gate 153 is activated during each alternate cycle of the rotating field and that field is deactivated by gate 174. If gate 152 is activated, circuit 161 reactivates the rotating field after a 600-millisecond delay indicative of an interdigit spacing. If two zeros occur in sequence, start-code detector 130 activates gate 135. In response, gate 148 is activated and flip-flop 160 is reset. In turn, gate 175 is disabled and operation ceases.

POWER SUPPLY

Figure 13:
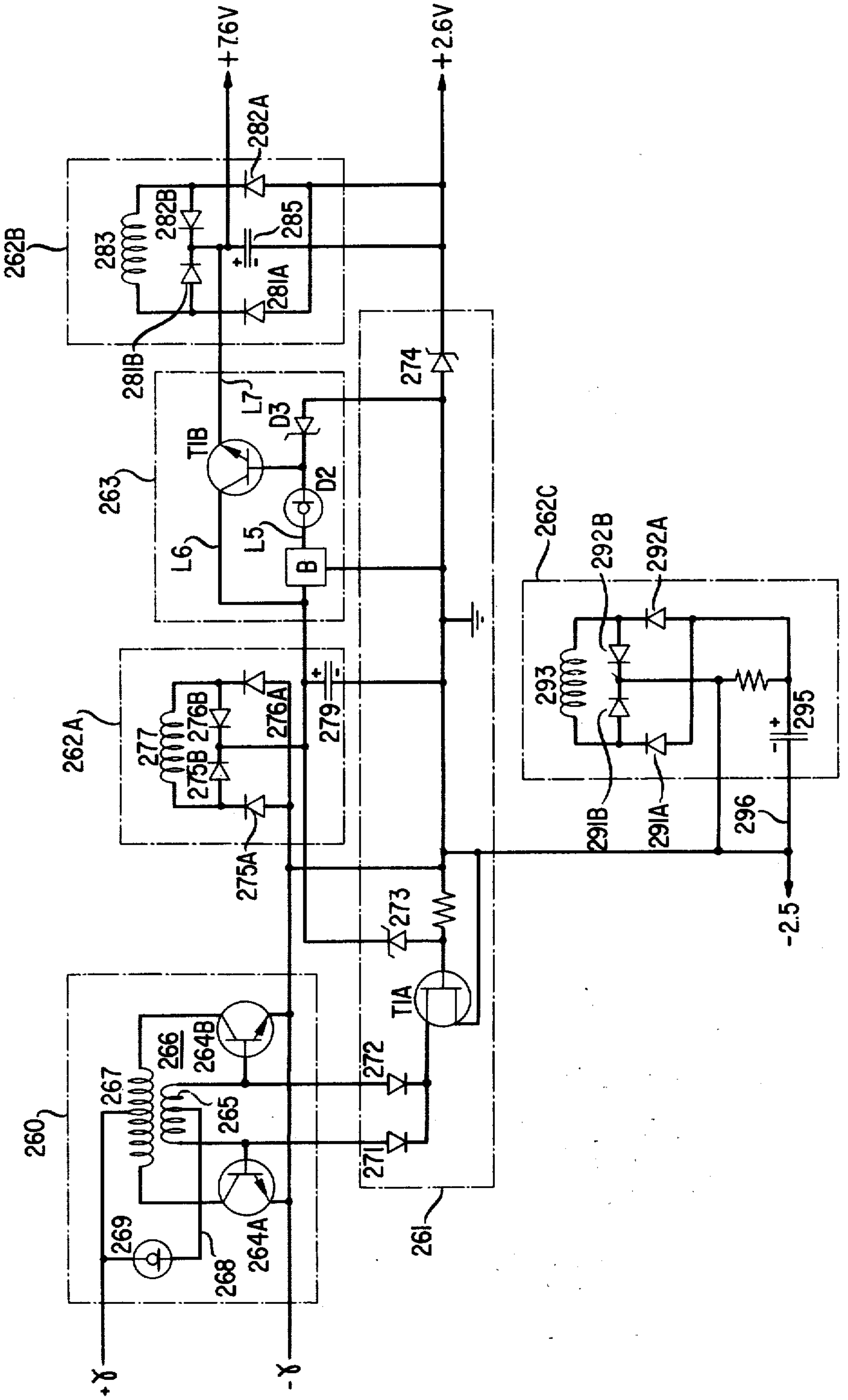

A schematic diagram of the power supply circuit represented by block 74 of FIG. 9 is shown in FIG. 13. The power supply is designed to respond to any of a variety of possible line conditions to provide +7.6 volts, +2.6 volts and −2.5 volts in the illustrative embodiment. The power supply comprises six basic component circuits shown encompassed by broken block indication 260, 261, 262A, 262B, 262C, and 263 in the figure. The circuit encompassed by block 260 is operative as a multivibrator, the circuit within block 261 is operative as a regulator circuit, and the (capacitor) circuits within blocks 262A, 262B, and 262C are operative as rectified regulated stages to produce the +7.6 volts, (−5 volts with respect to +7.6 volts) and −2.5 volts, respectively, necessary for the selected embodiment.

In general, circuits 260 and 261 operate to supply a regulated voltage to a parallel arrangement of the three capacitor circuits. In turn, the capacitor circuits supply requisite voltages to the control and drive circuits of FIG. 9. Relatively high, medium, and relatively low voltages are supplied by the three capacitor circuits, respectively. Circuit 261 provides a course (5 percent) regulation of the power supplied by (multivibrator) circuit 260. The highest value capacitor, in circuit (or stage) 262A, regulates the multivibrator if the voltage of that capacitor varies. The medium voltage capacitor, in circuit 262B, draws on the capacitor of circuit 262A if the value of the former changes. The lowest value capacitor is sufficiently low in value to be limited, in variation, by the turns ratio of the coils with which they are coupled to the multivibrator circuit. Circuit 263 is operative as a precision (1 percent) regulator for the capacitor of the circuit 262A.

The multivibrator circuit comprises first and second transistors 264A and 264B, the base electrodes of which are connected across a secondary winding 265 of a transformer 266 as shown in FIG. 13. The collector electrodes of the transistors are connected to the primary winding 267 of the transformer. The emitters of the transistors are connected to the (common of FIG. 9) negative side of the telephone line as shown in the figure. The center taps of the primary and secondary windings of the transformer are connected by an electrical path 268 which includes a constant current diode 269. The center tap of the primary winding of the transformer is connected to the positive side of the line as shown in the figure.

The multivibrator circuit is operative in the manner of conventional multivibrators, the circuit differing primarily in that the base current of the two transistors is determined by constant current diode 269 in the feedback path 268 and is switched between the bases by the induced voltage in the secondary winding 265. The circuit also permits a variation in voltage at the primary center tap. The arrangement results in a constant base supply regardless of conditions on the telephone line. The output of the multivibrator is supplied to the regulated stages 262A, 262B, and 262C through secondaries and the diodes of the regulated stages.

The regulator circuit 261 comprises diodes 271 and 272, zener diodes 273 and 274, and enhancement mode field effect transistor T1A. Diodes 271 and 272 are connected between the base electrodes of transistors 264A and 264B, respectively, in order to isolate the base regions of those transistors, and transistor T1A.

The regulated circuit 262A comprises diodes 275A, 275B, 276A, and 276B. The diodes are connected between opposite ends of a transformer secondary 277 and across diode 273 as shown in FIG. 13. A capacitor 279 is connected between the negative side of the line and diode 273.

Diode 273 at regulation voltage, turns on transistor T1A and shunts the base drive from transistors 264A and 264B thus reducing the oscillation level of the multivibrator circuit to a point where capacitor 279 just maintains 11.5 volts. Otherwise, the voltage across the capacitor fluctuates to reflect variations with line conditions and load.

The second regulated stage 262B similarly includes diodes 281A and 281B and diodes 282A and 282B connected between opposite ends of a transformer secondary 283, and capacitor 285. Capacitor 285 is connected to the +7.6 volt output and is charged to −5 volts with respect to 7.6 volts. In operation, capacitor 285 just maintains voltage as does capacitor 279 because of the turns ratio of coils 277 and 283 thus avoiding fluctuations which reflect line conditions and load. Zener diode 274 allows current to be drained from capacitor 279 if capacitor 285 discharges somewhat to drop the −5 volt output below its nominal value. Diode 274 thus functions to avoid the discharge of capacitor 285, this operation in turn, causes increased oscillation of transistors 264A and 264B and the recharging of capacitors 279 and 285.

Regulated stage 262C similarly includes diodes 291A and 291B and diodes 292A and 292B connecting opposite sides of secondary 293 across capacitor 295 as shown. The stage is driven from secondary 293 in a manner similar to that described above. Capacitor 295 is charged to 2.5 volts. Its positive terminal is connected to the negative (common) line providing −2.5 volts at 296. The turns ratio of secondary 293 and secondary 277 provides the regulation.

Base bias voltage to transistors 264A and 264B of the multivibrator circuit is provided by constant current diode 269 which drives the center tap of the feedback winding 265. Since the diode is a constant current generator, the induced voltage in the feedback secondary switches the constant current between the transistor bases. This feedback arrangement is operative to limit the collector current in the transistors 264A and 264B to a level which prevents unacceptable loading on the line and ensures proper operation of the power supply over the field range of customer loop lengths.

Diode 273 is a voltage reference diode which conducts when capacitor 279 reaches +11.5 volts and shunts transistor T1A. This transistor shunts the base drive current from the transistors 264A and 264B through isolation diodes 271 and 272 to a level to just maintain the +11.5 volts. If capacitor 285 is discharged below −5 volts, diode 274 conducts thus reducing the voltage on capacitor 279. This voltage reduction causes the oscillations of the multivibrator to increase and, thus, the capacitors to recharge.

Circuit 263 comprises a transistor T1B, the base electrode of which is connected via zener diode D3 to the negative (common) line and via a constant current diode D2 to a voltage level detector represented by block B. Detector B is connected between the 279 capacitor voltage and negative common lines as shown in the figure. Detector B switches on when capacitor 279 reaches sufficient voltage to power the circuit. When B is on, lead L5 is connected to lead L6 powering the regulator which produces 7.6 volts at lead L7. Regulated stage 263 provides the +7.6 volts required and is switched on when capacitor 279 reaches a usable level.

The write operation of the repertory dialer includes the generation of a domain in a coded position of the expansion detector as already discussed above. In order to so generate a domain and to insure that it expands quickly for detection as it moves (only a few stages) to the detector stage of that arrangement, the driver circuit 72 of FIG. 9 is designed to provide a ramp-shaped output to one and an initializing pulse to the other of the two drive coils.

DRIVER CIRCUIT

Figure 14A:
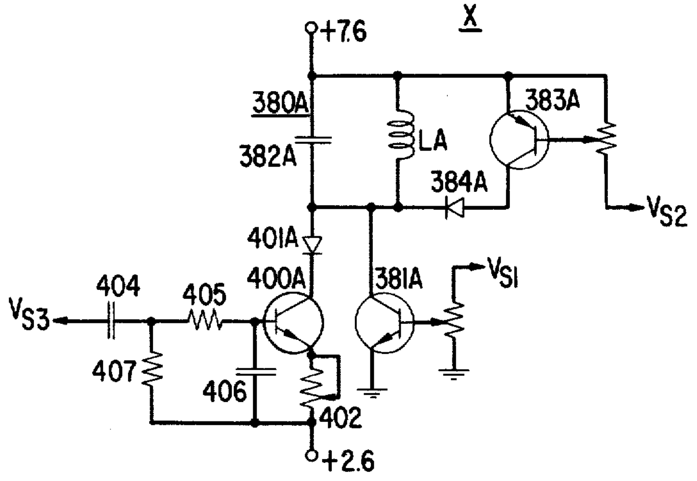
FIGS. 11, 12, 13, 14A and 14B are circuit diagrams for the logic and drive arrangement of the repertory dialer system.
Figure 14B:
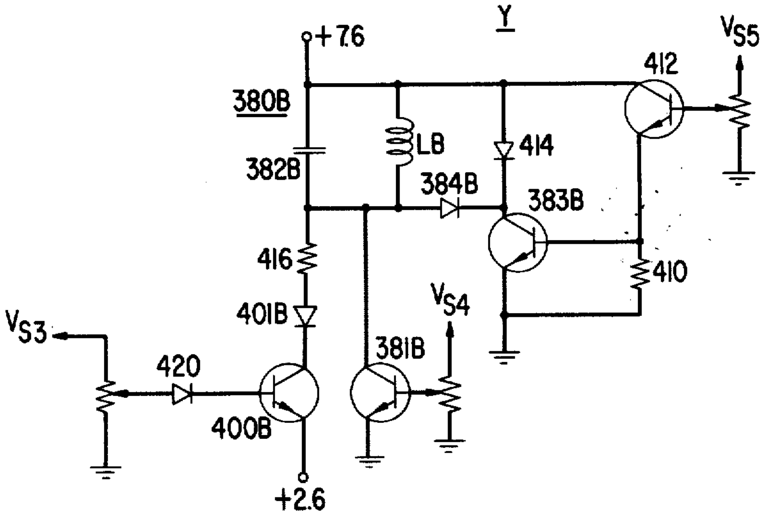

FIGS. 14A and 14B show the driver circuit diagrams for the two orthogonally disposed coils familiar to bubble, field-access memories and designated 71 in FIG. 9. The circuit for one coil is slightly different from the other as can be seen in the figures. Each driver circuit is basically a tuned circuit which combines the advantages of resonant circuits and class C drivers while eliminating all series switching in the tuned circuit in order to achieve high efficiency.

The orthogonal coils are designated X and Y and the driver circuits are similarly designated in FIGS. 14A and 14B, respectively. The X driver comprises a tuned circuit 380A connected between the collector of a transistor 381A and a reference potential of +7.6 volts. The tuned circuit includes a capacitor 382A and an inductance LA. Inductance LA corresponds to the horizontally oriented coil 71 of FIG. 9. The collector of transistor 381A is connected to the collector of a second transistor 383A through isolation diode 384A. The emitter of transistor 381A is connected to ground; the emitter of transistor 383A is connected to +7.6 volts with respect to ground. Signals $V_{S1}$ and $V_{S2}$ from clock 103 of FIGS. 11 and 12 are applied to the bases of transistors 381A and 383A, respectively, during operation.

The circuit of FIG. 14A also shows additional start-up circuitry. The start-up circuitry includes a transistor 400A connected between resonant circuit 380A and reference voltage +2.6V (−5.0V with respect to +7.6 volts) via a diode 401A and a resistor 402, respectively. A signal $V_{S3}$ is applied to the base of transistor 400A via capacitor 404 and resistor 405 during operation. Signal $V_{S3}$ is the output voltage level from OR circuit 116 of FIG. 12. The base of transistor 400A is connected to the reference (+2.6) voltage via a capacitor 406. Capacitor 404 is connected to the reference potential via a resistor 407.

In order to produce the requisite rotating in-plane field, a second (Y) driver circuit is required. FIG. 14B shows the Y driver with various elements designated as are their counterparts in the circuit of FIG. 14A except that the letter B is included in the designation instead of the letter A.

The Y driver circuit includes a tuned circuit 380B including a capacitor 382B and an inductance LB where LB corresponds to the vertically oriented inductor 71 of FIG. 9. The tuned circuit is connected between the collector of a transistor 381B and +7.6 volts. The collector of transistor 381B is connected to the collector of a second transistor 383B through isolation diode 384B. The emitter of transistor 381B is connected to ground; the emitter of transistor 383B is also connected to ground in this circuit. The base of transistor 383B is connected to ground via a resistor 410 and to the emitter of a transistor 412. The collector of transistor 383B is connected to +7.6 volts via an isolation diode 414. The collector of transistor 412 is also connected to +7.6 volts. The signals $V_{S4}$ and $V_{S5}$, corresponding to signals $V_{S1}$ and $V_{S2}$ in FIG. 14A, are applied to the bases of transistors 381B and (383B via) transistor 412, respectively, during operation.

The tuned circuit 380B is also connected to the collector a transistor 400B via a resistance 416 and a diode 401B. The emitter of transistor 400B is connected to +2.6 volts. The input signal $V_{S3}$ is applied to the base of transistor 400B via diode 420.

In operation, the in-plane field for domain movement is initiated when a button of pushbutton array 76 of FIG. 9 or 77 of FIG. 10 is depressed, thus applying a voltage level $V_{S3}$ to the circuits.

The capacitor 404 and resistance 407 of the circuit of FIG. 14A differentiate the incoming level ($V_{S3}$). The resulting signals are then integrated to provide the initializing pulse signal shown for the X axis in FIG. 15. Voltage level $V_{S3}$, applied to the base of transistor 400B of FIG. 14B, operates to increase the lateral elongation of a domain strip in the expansion detector of FIG. 2 by increasing the rotating field to full strength quickly and by generating a lateral line of magnetic poles in the stages of the expansion detector arrangement along which a bubble can strip out. In this manner, the Y driver provides the start up ramp-hold which is employed by the bubble repertory dialer to store the resonant energy in the coil for starting the resonant circuit.

After initialization of the driver circuits (when $V_{S3}$ terminates), clock 103 of FIG. 12 applies a momentary voltage $V_{S1}$ to the base contact of transistor 381A. This signal causes the charging of capacitor 382A to voltage $V_{S1} - V_{381A}$, where $V_{S1}$ is the supply voltage (+7.6) and $V_{381A}$ is the voltage drop across transistor 381A when it is saturated. The current in inductor LA begins to vary sinusoidally. At the end of each cycle, the energy is stored in capacitor 382A, but at a voltage lower than the initial voltage due to losses in the coil. In order to maintain oscillation, transistor 381A is turned on briefly every cycle to increase the voltage across capacitor 382A to the initial voltage.

In order to stop the rotation of the in-plane field, a signal $V_{S2}$ is applied to transistor 383A of the X driver to turn on the transistor. Capacitor 382A discharges in response. Transistor 383A thus shunts capacitor 382A for turning off the in-plane field in the X axis. Diode 384A prevents the flow of current from transistor 383A across the collector-base junction thereof when the resonant circuit swings positive with respect to ground. Diodes 384B and 414 and transistor 383B shown in FIG. 14B form a bridge operative to shunt the resonant capacitor at its positive peak voltage in order to turn off the Y driver circuit.

Operation is essentially the same for the X and Y drivers. The drivers, however, are driven 90° out of phase with one another and at constant current with the signals $V_{S4}$ and $V_{S5}$ applied to the Y driver, corresponding to signals $V_{S1}$ and $V_{S2}$ applied to the X driver.

Figure 15:
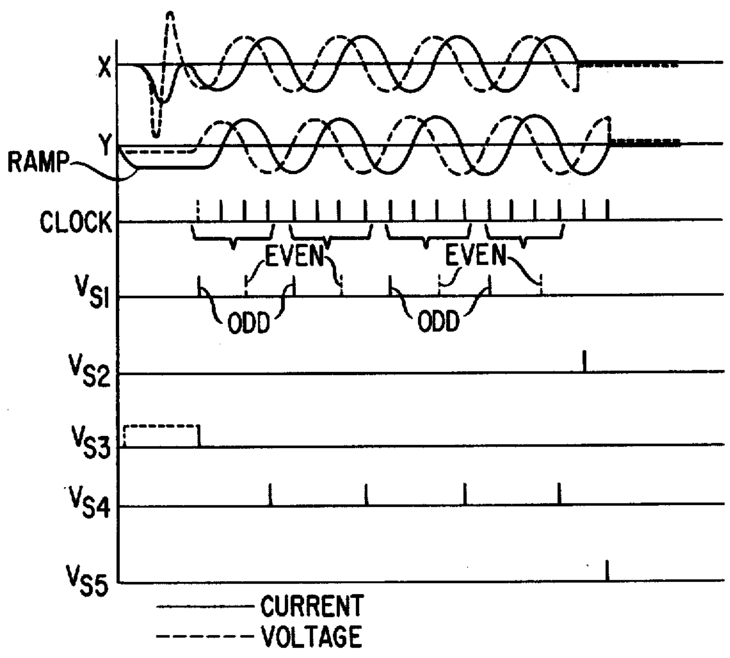
FIG. 15 is a pulse diagram for the operation of the circuits of FIGS. 14A and 14B.

FIG. 15 shows the timing of the various signals $V_{S1}$, $V_{S2}$, $V_{S3}$, $V_{S4}$, and $V_{S5}$ for the circuits of FIGS. 14A and 14B, with respect to a clock, as well as the X and Y drive output waveforms for those circuits. The solid waveform represents current in the coils of the drive field; the broken waveform represents voltage.

Four cycles of the in-plane field are illustrated in FIG. 15, for storing a binary 1 representation. The clock (103) provides four timing pulses for each (of four phases of a) cycle where the first timing pulse to the left as shown does not actually occur. The clock pulses actually start with the second pulse from the left when the ramp (see FIG. 15) terminates. The designations of odd and even cycles are arbitrary and refer to alternate cycles of the in-plane field. These timing pulses (shown as $V_{S1}$ even and $V_{S1}$ odd in FIG. 15) are applied to the logic elements of FIGS. 11 and 12 as indicated in those figures in accordance with well-understood techniques.

THE DRIVE COIL

The low power requirements of the arrangement of FIG. 1 in the system of FIG. 9 as well as the simplicity of the drive circuity of FIGS. 14A and 14B is due, to a considerable extent, to the coil design for providing the rotating magnetic field for bubble movement and to the geometry of the thin film arrangement in which bubble movement occurs. As is well known, two coils are commonly used to provide the requisite rotating magnetic field for bubble movement. In practical arrangements, one coil is physically placed within the other.

The amount of power required is a function of the size of the coils. A critical dimension, thus, is the inside diameter of the inner coil since this determines essentially all other measurements. The inside diameter in turn need only be large enough to permit insertion of the bubble chip with lead connections within the inner coil. Bubble chips are formed, with great success, by liquid phase epitaxial techniques producing a thin layer on a nonmagnetic crystal substrate. The substrates are about 7 mils thick and the epitaxial bubble layer is about 0.25 mil thick. An oxide layer coating the bubble typically, separates the plane of the magnetically soft pattern from the surface of the bubble layer. Lead connections, for the control of special functions within the bubble chip, add to the overall thickness of the chip. Chips have been made in this manner, as shown in FIGS. 1–3, to fit within an inner coil having inside dimensions as follows:

length: 0.180 inch
width: 0.130 inch
height: 0.015 inch

The inner coil in one particular embodiment had 258 turns in six layers using No. 39 (3.7 mil) wire. The coil had a dc resistance of 7.7 ohms (with leads). The outer coil had the following dimensions:

length: 0.200 inch
width: 0.300 inch
height: 0.070 inch

The outer coil had a dc resistance of 2.1 ohms.

Measurements with a Q meter indicated that the inner coil had an inductance of 66.2μH, an added capacitance of 38255pf needed to resonate at 100 kHz, and a Q (at 100 kHz) of ≈ 2. The outer coil had an inductance of 68.7 μH, an added capacitance of 36,820pf needed to resonate at 100 kHz, and a Q of 17.0.

At 30 oersteds drive field at 100 kHz, the current in the inner and outer coils, respectively, was 45.9 ma and 120 ma. Repertory dialers of the type described have been operated reliably with 8 to 9 milliwatts average power supplied over existing telephone lines.

In general, bubble replication and bubble generation operations may be substituted one for the other, each resulting in the presence of a bubble in a desired position. Although the illustrative embodiment herein is described in terms of bubble replication, it should be understood that generators may be substituted for some or all of the replicators. Only minor modification of the repertory dialer is necessary to accommodate the substitution.

Further, the dialer has been described in terms of a pushbutton to dial pulse operation as a substitute for a rotary dialer input. Of course, the rotary dialer itself may be adapted directly for operating a repertory dialer in accordance with this invention.

The detector arrangement for the bubble circuit included two meandering magnetoresistance detectors in two consecutive stages of the expansion detector arrangement as indicated by the two solid vertical line segments in FIG. 3 at stage 31 and the stage to the immediate right thereof as viewed. Two closely spaced detectors of this type are easily matched for incorporation into a bridge for noise cancellation, as is well known for bubble devices. The detector lead connections and the ground connection are so designated in FIGS. 2 and 3.

What has been described is considered merely illustrative of the principles of this invention. Therefore, various modifications of this invention can be devised by those skilled in the art in accordance with those principles within the spirit and scope of the invention as covered by the following claims.

What is claimed is:

1. Magnetic apparatus comprising a layer of material in which single wall domains can be moved, and a pattern of elements coupled to said layer for defining therein a plurality of minor loops and a major path for the movement of domains therealong responsive to a magnetic field reorienting in the plane of said layer, said minor loops being closely spaced with respect to associated stages of said major path at control positions therebetween, first means for controllably annihilating domains at a selected one of said control positions, second means for controllably replicating domains at a selected one of said control positions, and means responsive to first and second control signals for activating said first and second means, respectively.

2. Magnetic apparatus in accordance with claim 1 also including a multistage expansion detector arrangement including a detector stage, said major path being of a geometry to move domains to said detector stage, each of said minor loops having a first number of stages, said major loop including an output portion between said detector stage and the nearest of said minor loops greater than said first number.

3. Magnetic apparatus in accordance with claim 2 wherein said major path includes an input portion having a plurality of input stages, and electrical conductor means including a plurality of electrical conductors connected electrically in series at said stages and being of a geometry to generate there a number of domains representative of the one of said plurality of electrical conductors pulsed.

4. Magnetic apparatus in accordance with claim 3 wherein each of said plurality of conductors is coupled to said layer in a manner to generate a queuing domain in an associated stage of said expansion detector arrangement a coded distance from said detector stage indicative of the one of said conductors pulsed.

5. Magnetic apparatus in accordance with claim 4 also including means responsive to a pulse in one of said plurality of conductors for activating said drive field for advancing domains in said layer.

6. Magnetic apparatus in accordance with claim 5 for terminating said drive field responsive to the arrival of said queuing domain at said detector stage.

7. Magnetic apparatus in accordance with claim 6 wherein said pattern of elements also defines a multistage spur track for advancing domains through a replication stage to an annihilator, said plurality of conductors being coupled to said layer at associated stages of said spur track and being adapted to generate a domain in a coded stage therein indicative of the one of said plurality of conductors pulsed, said spur track being arranged to advance a domain from said coded stage to said replicate position during the advancement of said code domain in said expansion detector arrangement to said detector stage.

8. Magnetic apparatus in accordance with claim 7 in combination with a plurality of repertory push buttons, wherein said first and said second means comprises a plurality of conductors coupled to associated ones of said control positions, each of said push buttons being associated with one of said conductors of said first and second means for replicating information from a selected one of said minor loops into said major path, means responsive to the depression of one of said repertory buttons for advancing domains in said layer at a first relatively fast rate, means responsive to the arrival of a domain at said detector stage for advancing domains in said layer at a controlled relatively slow rate, and means responsive to the passage of a number of domains through said detector stage for forming an output pulse sequence indicative of the number of domains generated by said electrical conductor means.

9. A magnetic memory arrangement comprising a layer in which single wall domains can be moved, a pattern of elements for moving domains in said layer responsive to a magnetic field reorienting in the plane of said layer, said pattern defining a plurality of minor channels and a major channel, said pattern also defining a multistage expansion detector arrangement, a plurality of electrical conductors coupled to said layer at associated ones of said stages of said detector arrangement and being connected electrically in series to said layer at consecutive write positions in said major channel, said conductors being operative to generate a coded number of domains in said major channel and to simultaneously generate a domain in a coded one of said stages of said expansion detector arrangement depending on which of said conductors is pulsed.

10. A magnetic memory arrangement comprising a layer of material in which single wall domains can be moved, a pattern of elements for moving domains in said layer responsive to a magnetic field reorienting in the plane of said layer, said pattern defining a plurality of multistage minor channels each including a reference position and a multistage major channel, including a plurality of write positions, said pattern also defining a multistage spur track arrangement including a reference position, a plurality of electrical conductors coupled to said layer at associated ones of said stages of said spur track arrangement and being connected electrically in series to said layer at said consecutive write positions in said major channel, said conductors being operative when pulsed to generate a coded number of domains in said write positions and to simultaneously generate a domain in a coded one of said stages of said spur track arrangement depending on which of said conductors is pulsed.

11. A magnetic memory in accordance with claim 10 wherein said major loop includes a detector stage and said conductors are coupled to coded stages in said major loop spaced coded numbers of stages from said detector stage in a manner to generate a domain in one of said coded stages indicative of the conductor pulsed, said memory also including means responsive to a pulse in one of said conductors for activating said magnetic field, and means responsive to the arrival of a coded domain at said detector stage for deactivating said magnetic field.

12. A magnetic memory in accordance with claim 11 including means responsive to a first external signal for providing a domain in a stage of said major channel associated with said reference position of said spur track arrangement if a domain is present in said spur track arrangement at said reference position, means responsive to said first external signal for activating said magnetic field, and means responsive to said first external signal for annihilating domains in a selected one of said minor channels at the associated reference position.

13. A magnetic memory in accordance with claim 12 wherein said memory also includes means responsive to the arrival of a domain from said associated stage of said major path at said detector stage for terminating annihilation of domains at said minor channel.

14. A magnetic memory in accordance with claim 13 wherein said reference position of said spur track comprises a replicate position for replicating a domain into the associated position of said major channel and said spur track arrangement includes an annihilator for annihilating domains which pass said replicate position.

15. A magnetic memory in accordance with claim 14 wherein said write positions in said major channel are separated from the closest of said minor channels by a number of stages greater than that separating said associated position in said major channel from said detector stage.

16. A magnetic memory in accordance with claim 15 also including means responsive to the arrival at said detector stage of a domain from said associated position of said major channel for replicating domains from said major channel into a selected minor channel at said reference position in said minor channel.

17. A magnetic memory in accordance with claim 16 wherein said reference position in each of said minor channels is defined by said pattern of elements and an electrical conductor operative to annihilate or replicate domains there, and said memory includes means responsive to the arrival of a domain from said associated position of said major channel at said detector stage for changing the operation at said reference position from annihilation to replication.

18. A magnetic memory in accordance with claim 17 wherein said minor channels are recirculating loops for recirculating domain patterns representative of information through associated reference positions in response to said magnetic field.

19. A magnetic memory in accordance with claim 18 wherein said recirculating domain patterns are representative of stored telephone numbers and said magnetic field is activated by power supplied over telephone lines from a central office through a station set and enabled by a subscriber-activated signal.

20. A communication station set including first means for connecting said set to a communication path, in combination with a magnetic arrangement comprising a layer of material in which single wall domains can be moved, a pattern of elements coupled to said layer for defining therein a plurality of channels along which domains are moved responsive to a magnetic drive field reorienting in the place of said layer, second means for generating said field, and third means responsive to a signal and enabled by said first means for applying power from said communication path to said field generating means.

* * * * *